(12) United States Patent
Stojanovski

(10) Patent No.: US 12,263,608 B2
(45) Date of Patent: *Apr. 1, 2025

(54) PIZZA PAN WITH PRECISE CUTTING GUIDELINES

(71) Applicant: Dimitrije Stojanovski, Shelby Township, MI (US)

(72) Inventor: Dimitrije Stojanovski, Shelby Township, MI (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/321,197

(22) Filed: May 14, 2021

(65) Prior Publication Data

US 2021/0268677 A1    Sep. 2, 2021

Related U.S. Application Data

(63) Continuation of application No. 15/705,387, filed on Sep. 15, 2017, now Pat. No. 11,027,446, which is a continuation-in-part of application No. 15/078,460, filed on Mar. 23, 2016, now Pat. No. 10,800,059.

(51) Int. Cl.
| | |
|---|---|
| *B26D 3/24* | (2006.01) |
| *A47J 37/01* | (2006.01) |
| *B26B 29/06* | (2006.01) |
| *A47J 47/00* | (2006.01) |

(52) U.S. Cl.
CPC .......... *B26B 29/063* (2013.01); *A47J 37/01* (2013.01); *B26D 3/24* (2013.01); *A47J 47/005* (2013.01)

(58) Field of Classification Search
CPC .......... B26D 3/245; B26D 3/24; A47J 47/005; B26B 29/063
See application file for complete search history.

(56) References Cited

U.S. PATENT DOCUMENTS

| | | | | |
|---|---|---|---|---|
| 1,297,671 | A * | 3/1919 | Fairbank | B26D 3/245 33/525 |
| 2,304,966 | A * | 12/1942 | Thrower | B26B 29/063 99/428 |
| 3,060,838 | A * | 10/1962 | Philip | A21C 15/04 99/DIG. 15 |
| 3,115,104 | A * | 12/1963 | Enoch | A21C 15/02 99/428 |
| 3,516,573 | A * | 6/1970 | John | A47J 36/022 220/608 |
| 4,100,676 | A * | 7/1978 | Ferguson | A47G 19/022 33/525 |
| D257,656 | S * | 12/1980 | Walker | D10/64 |
| 6,257,434 | B1 * | 7/2001 | Lizzio | B65D 43/162 220/4.23 |
| D657,209 | S * | 4/2012 | Getzinger | A47G 19/022 D7/698 |

(Continued)

*Primary Examiner* — Dana Ross
*Assistant Examiner* — Lawrence H Samuels
(74) *Attorney, Agent, or Firm* — Howard & Howard Attorneys PLLC

(57) ABSTRACT

A cooking pan includes guidelines configured to aid in precisely cutting a food product into slices with desired shapes. The cooking pan includes a flat base, at least one raised wall surrounding the flat base, and a rim at a top of the raised wall. The pan further includes a plurality of the guidelines formed upon the pan, each guideline comprising a depressed groove, wherein each guideline extends contiguously from the flat base, up the raised wall, and onto the rim.

16 Claims, 22 Drawing Sheets

(56) References Cited

U.S. PATENT DOCUMENTS

| | | | | |
|---|---|---|---|---|
| D667,678 S | * | 9/2012 | Sensenig | D7/354 |
| 9,198,437 B2 | * | 12/2015 | Ventimeglia | B28B 7/02 |
| 10,244,900 B2 | * | 4/2019 | Getzinger | G06Q 90/00 |
| D939,265 S | * | 12/2021 | Stojanovski | D7/359 |
| 2006/0180031 A1 | * | 8/2006 | Carlson | A21C 15/04 |
| | | | | 99/537 |
| 2007/0169636 A1 | * | 7/2007 | Carlson | A47G 19/022 |
| | | | | 99/279 |
| 2013/0036882 A1 | * | 2/2013 | Getzinger | B26D 3/245 |
| | | | | 269/295 |
| 2014/0099418 A1 | * | 4/2014 | Getzinger | B26D 3/24 |
| | | | | 426/520 |
| 2015/0134571 A1 | * | 5/2015 | Getzinger | A47G 19/022 |
| | | | | 269/295 |

* cited by examiner

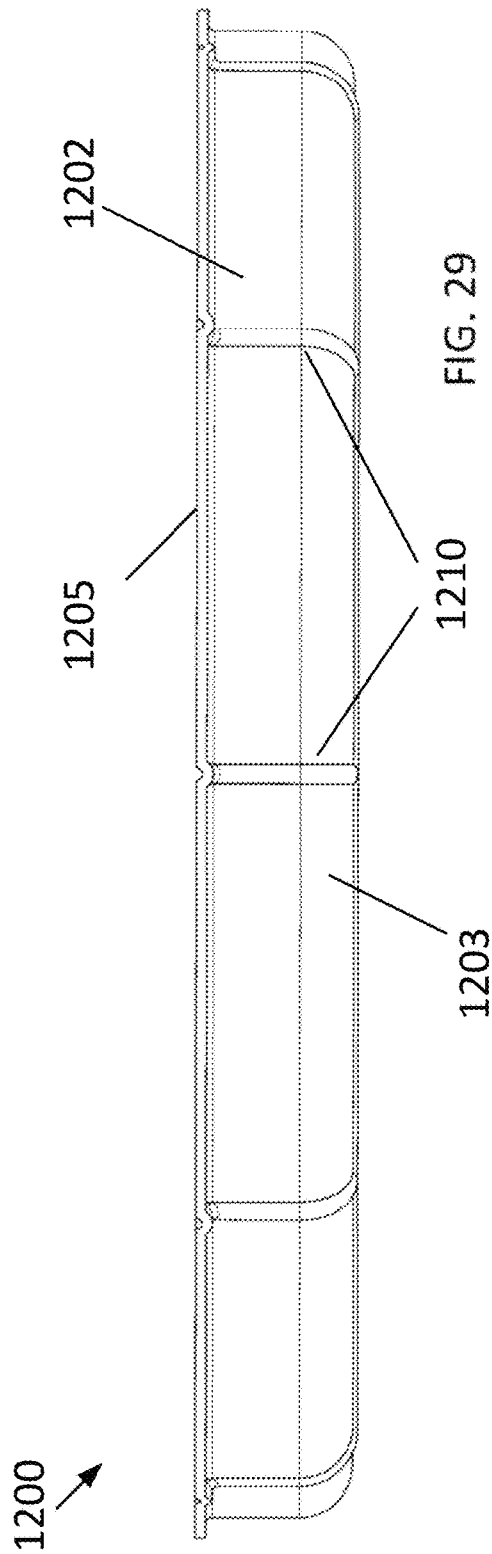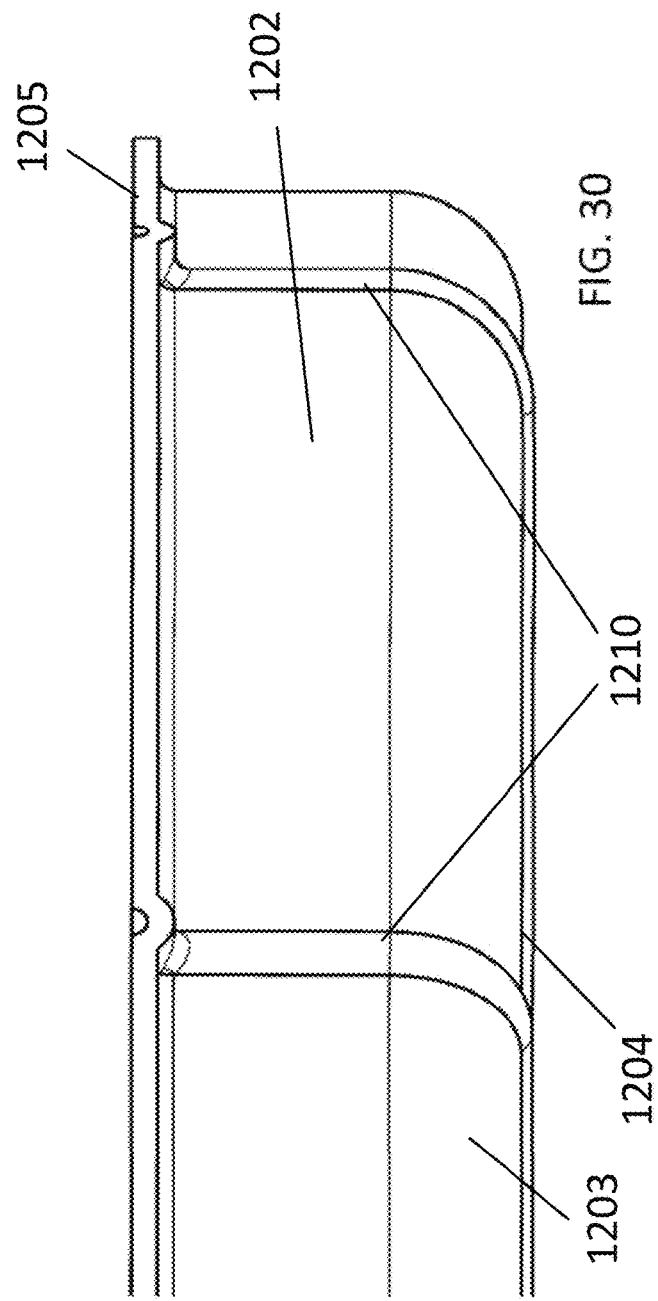

PIZZA PAN WITH PRECISE CUTTING GUIDELINES

CROSS REFERENCE TO RELATED APPLICATIONS

This disclosure is a continuation of U.S. patent application Ser. No. 15/705,387 filed on Sep. 15, 2017 which is a continuation in part application of U.S. patent application Ser. No. 15/078,460 filed on Mar. 23, 2016, both of which are hereby incorporated by reference.

TECHNICAL FIELD

This disclosure is related to a pan for cooking, particularly to a pizza pan with guidelines facilitating precise cutting of pizza.

BACKGROUND

The statements in this section merely provide background information related to the present disclosure. Accordingly, such statements are not intended to constitute an admission of prior art.

Pizza is cooked by placing rolled out pizza dough into a pan, applying toppings, and cooking the pizza in an oven. Once cooked, one uses a rolling pizza cutter to cut through the toppings and the dough. Precisely cutting a pizza can be difficult for an untrained worker. Similarly, sheets of cake, brownies, baked fruit bars, and other food products are baked or otherwise cooked in a tray pan and need to then be cut into pieces.

SUMMARY

A cooking pan includes guidelines configured to aid in precisely cutting a food product into slices with desired shapes. The cooking pan includes a flat base, at least one raised wall surrounding the flat base, and a rim at a top of the raised wall. The pan further includes a plurality of the guidelines formed upon the pan, each guideline comprising a depressed groove, wherein each guideline extends contiguously from the flat base, up the raised wall, and onto the rim.

BRIEF DESCRIPTION OF THE DRAWINGS

One or more embodiments will now be described, by way of example, with reference to the accompanying drawings, in which:

FIG. 13 illustrates a pan in the form of a decagon;

FIG. 14 illustrates a pan in the form of a circle;

FIG. 15 illustrates a pan with a rectangular portion and a half of a decagon portion;

FIG. 16 illustrates a pan with a rectangular portion and a hemispherical portion;

FIG. 17 illustrates a pan with a square profile;

FIG. 18 illustrates the guideline of FIG. 1 in profile;

FIG. 19 illustrates the guideline of FIG. 3 in profile;

FIG. 20 illustrates an exemplary alternative guideline in profile including a machined V-shaped guideline;

FIG. 21 illustrates an exemplary additional alternative guideline in profile including a pressed rounded guideline;

FIG. 29 illustrates in side view the pizza pan of FIG. 28, in accordance with the present disclosure;

FIG. 30 illustrates the pizza pan of FIG. 29 in greater detail, in accordance with the present disclosure;

DETAILED DESCRIPTION

A pizza pan configuration is disclosed including guidelines configured to aid in guiding a pizza cutter to precisely cut a pizza. Visible guideline locators are provided upon the pan, providing a user with an ability to easily locate a pizza cutter to guidelines located under the pizza.

Figure 1:
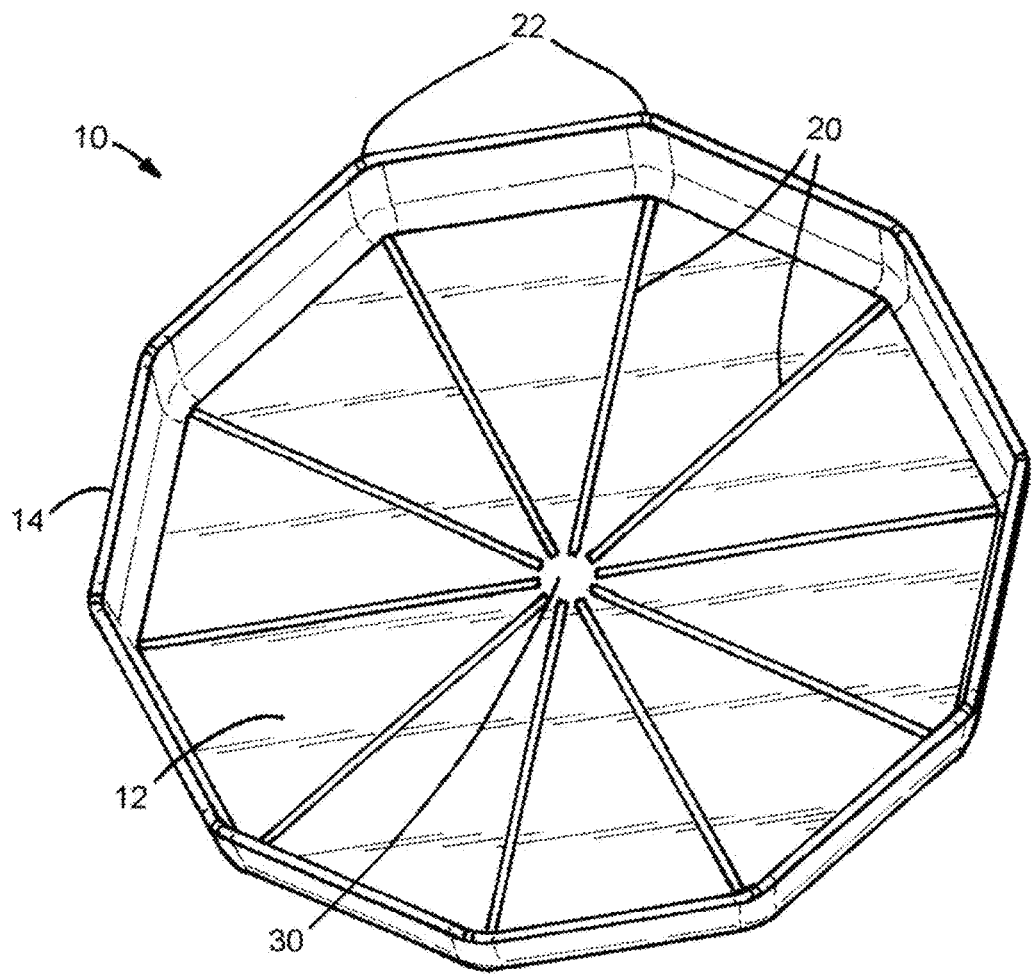
FIG. 1 illustrates an exemplary pizza pan including guidelines formed in a flat base of the pan and visible guideline locators on walls of the pan, the guidelines including through slots in the flat base, in accordance with the present disclosure.

Referring now to the drawings, wherein the showings are for the purpose of illustrating certain exemplary embodiments only and not for the purpose of limiting the same, FIG. 1 illustrates an exemplary pizza pan including guidelines formed in a flat base of the pan and visible guideline locators on walls of the pan, the guidelines including through slots in the flat base. Pizza pan 10 is illustrated including a flat base 12 and raised walls 14 around a perimeter of the pan. Guidelines 20 are illustrated extending outwardly radially from a center of the pan. In the embodiment of FIG. 1, guidelines 20 are through slots cut into, stamped from, or otherwise formed in flat base 12. In the center of the pan, the slots of guidelines 20 stop at a set radius from the center of the pan. If the slots were cut all the way through the center of the pan, the pan would be weakened, and triangular shaped panels of the pan not joined at the center of the pan would quickly bend and deform. By ceasing the slots of guidelines at a set radius from the center of pan 10, joining center 30 is formed, stabilizing pan 10 and joining the triangular portions of flat base 12. Visible guideline locators 22 are illustrated, one atop wall 14 above each end of a guideline 20. A user can use the guideline locators 22 to put a rolling pizza cutter into each of the guideline locators 22 and cut through the pizza. By doing so, the pizza cutter will be easily lined up to the guidelines 20 under the pizza. As the pizza cutter engages with the guidelines 20 and cuts through the pizza toward the center of the pan, the guidelines 20 keep the pizza cutter in precise alignment, forming pizza slices in the shapes of the guidelines formed upon pan 10.

In an alternative embodiment, visible guideline locators can be a mark upon the wall providing a visible indication of where the guideline is located without physically guiding a pizza cutter to the guideline.

According to the embodiment of FIG. 1, a polygonal pizza pan can include guidelines extending from each of the angular wall junctions of the pan to a central guideline junction.

Figure 2:
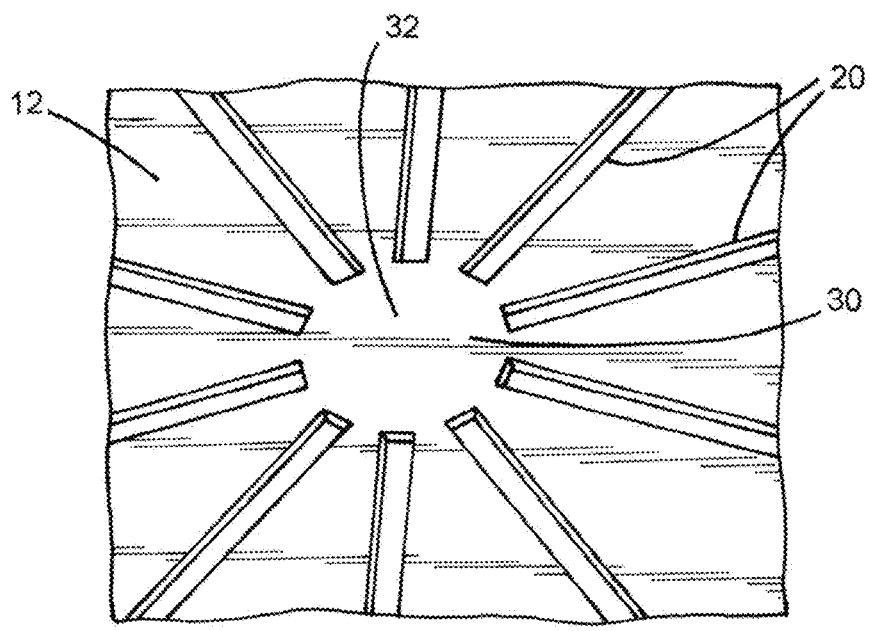
FIG. 2 illustrates the pizza pan of FIG. 1 in close up, illustrating a guideline joining center located at a center of the flat base, in accordance with the present disclosure.

FIG. 2 illustrates the pizza pan of FIG. 1 in close up, illustrating a guideline joining center located at a center of the flat base. Guidelines 20 embodied as through slots end at a set distance from a center 32 of the pan. Joining center 30 is formed, wherein no slots are cut in the pan material, and the pan material is joined at the center. Joining center 30 is small enough that a pizza cutter rolling out of the slots would only create insignificant differences in pizza slice geometries at the center of the pizza. Joining center 30 can have any diameter. Non-limiting exemplary diameters run from 2 inches to 0.75 inches in diameter.

The slots should be wide enough to accept a sharpened edge of a pizza cutter. Any exemplary width would be ⅛ of an inch.

Figure 3:
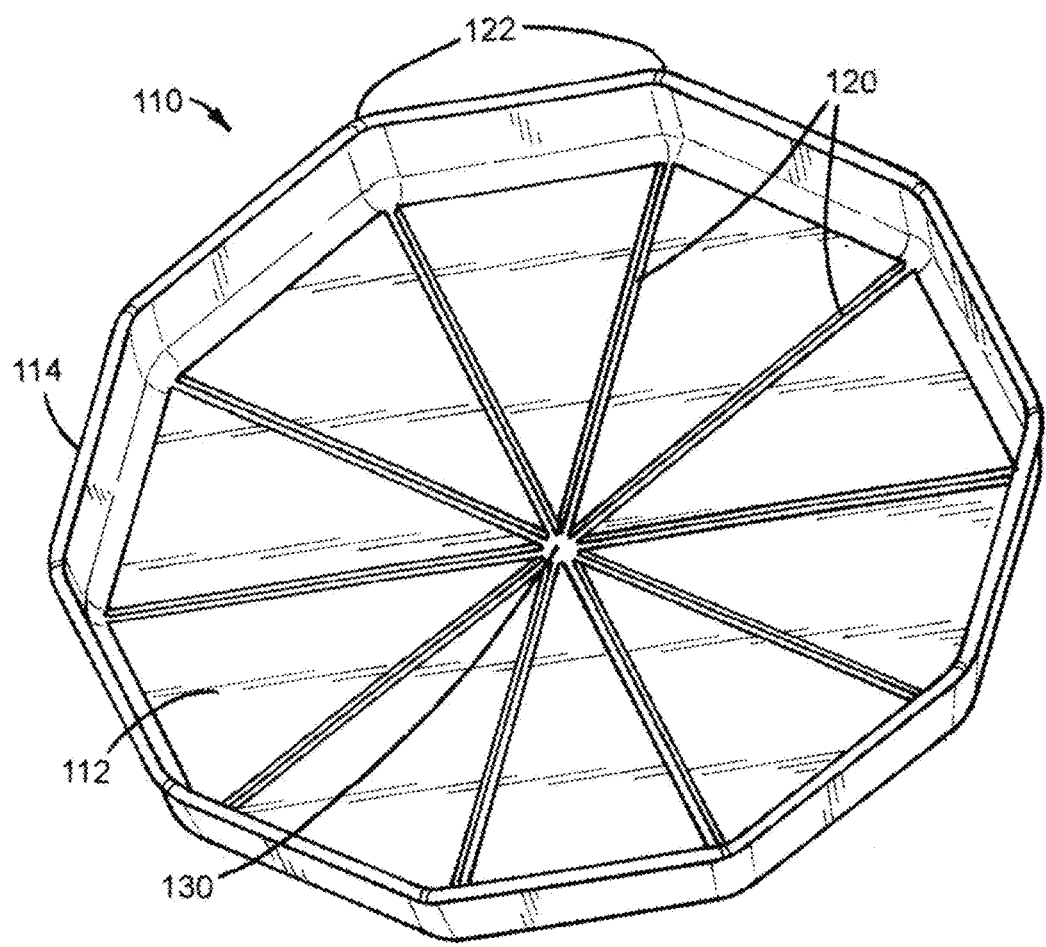
FIG. 3 illustrates an alternative exemplary pizza pan including guidelines formed in a flat base of the pan and visible guideline locators on walls of the pan, the guidelines including indented slots formed in the flat base, in accordance with the present disclosure.

FIG. 3 illustrates an alternative exemplary pizza pan including guidelines formed in a flat base of the pan and visible guideline locators on walls of the pan, the guidelines including indented slots formed in the flat base. Pizza pan 110 is illustrated including a flat base 112 and raised walls 114 around a perimeter of the pan. Guidelines 120 are illustrated extending outwardly radially from a center of the pan. In the embodiment of FIG. 3, guidelines 120 are indentations or slots not going entirely through the flat base 112. Guidelines 120 can be cut into, pressed into, or otherwise formed in flat base 112. In the center of the pan, the slots of guidelines 120 run through and overlap at a center of the pan, forming an indented slot junction 130. Visible guideline locators 122 are illustrated, one atop wall 114 above each end of a guideline 120. A user can use the guideline locators 122 to put a rolling pizza cutter into each of the guideline locators 122 and cut through the pizza. By doing so, the pizza cutter will be easily lined up to the guidelines 120 under the pizza. As the pizza cutter engages with the guidelines 120 and cuts through the pizza toward the center of the pan, the guidelines 120 keep the pizza cutter in precise alignment, forming pizza slices in the shapes of the guidelines formed upon pan 110.

Figure 4:
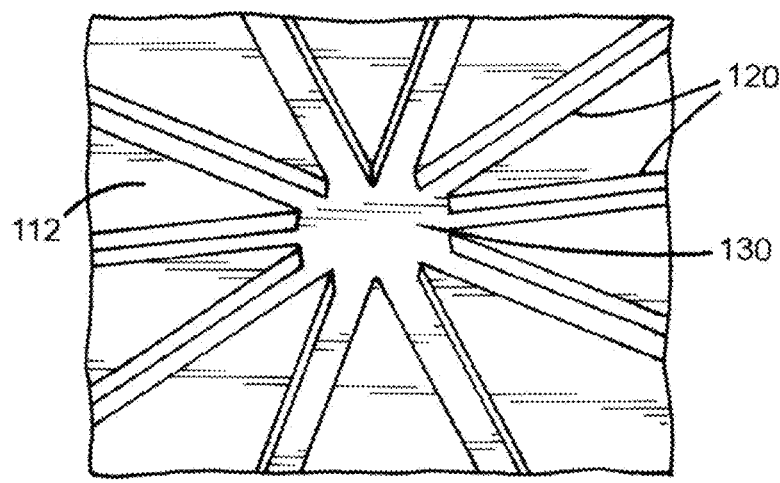
FIG. 4 illustrates the pizza pan of FIG. 3 in close up, illustrating an indented slot junction, in accordance with the present disclosure.

FIG. 4 illustrates the pizza pan of FIG. 3 in close up, illustrating an indented slot junction. Guidelines 120 embodied as indentations pressed or cut into pan 110. Indented slot junction 130 is formed, wherein the indented slots forming guidelines 120 overlap.

The indented slots should be wide enough to accept a sharpened edge of a pizza cutter. Any exemplary width would be ⅛ of an inch.

Figure 5:
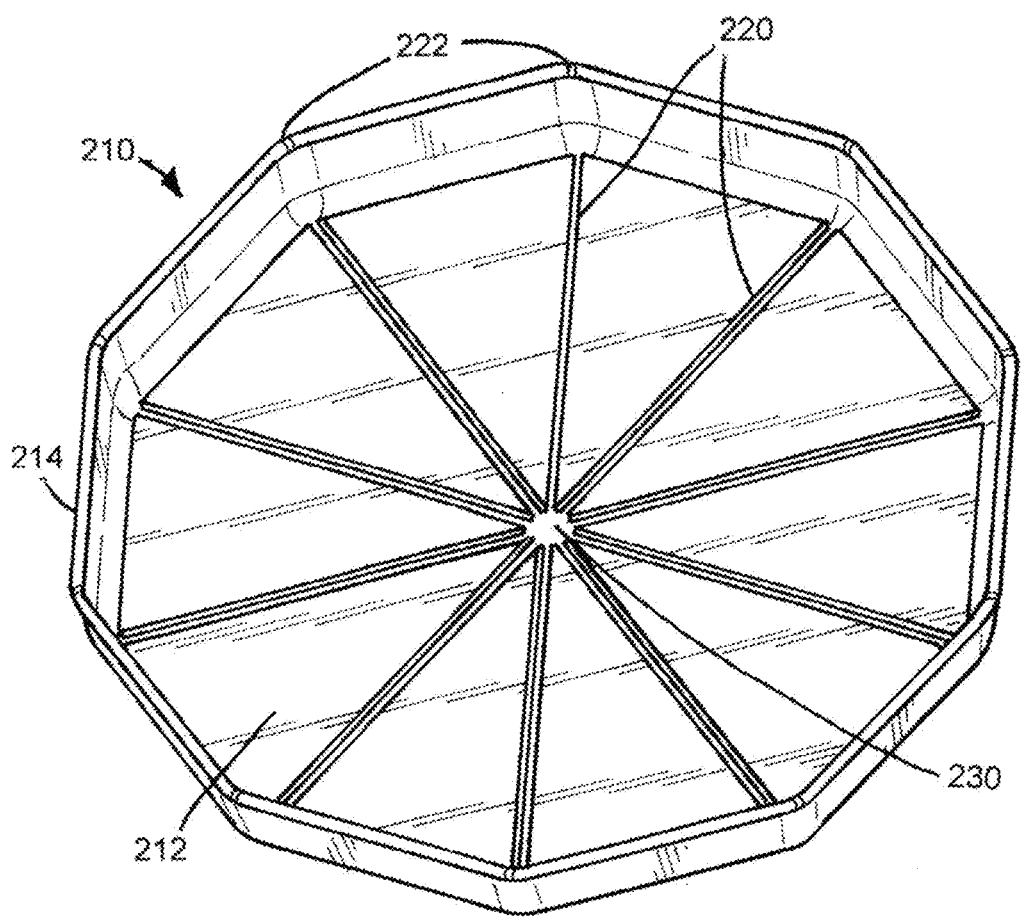
FIG. 5 illustrates an alternative exemplary pizza pan including guidelines formed in a flat base of the pan and visible guideline locators on walls of the pan, the guidelines including through slots in the flat base and a reinforced slot junction in a center of the pan, in accordance with the present disclosure.

FIG. 5 illustrates an alternative exemplary pizza pan including guidelines formed in a flat base of the pan and visible guideline locators on walls of the pan, the guidelines including through slots in the flat base and a reinforced slot junction in a center of the pan. Pizza pan 210 is illustrated including a flat base 212 and raised walls 214 around a perimeter of the pan. Guidelines 220 are illustrated extending outwardly radially from a center of the pan. In the embodiment of FIG. 5, guidelines 220 are through slots cut into, stamped from, or otherwise formed in flat base 212. In the center of the pan, the slots of guidelines 220 overlap through a center of the pan. Reinforced slot junction 230 is illustrated including the slots of the guidelines 220 overlapping and with additional material added or formed upon an underside of the pan joining the triangular sections of the pan together.

Figure 6:
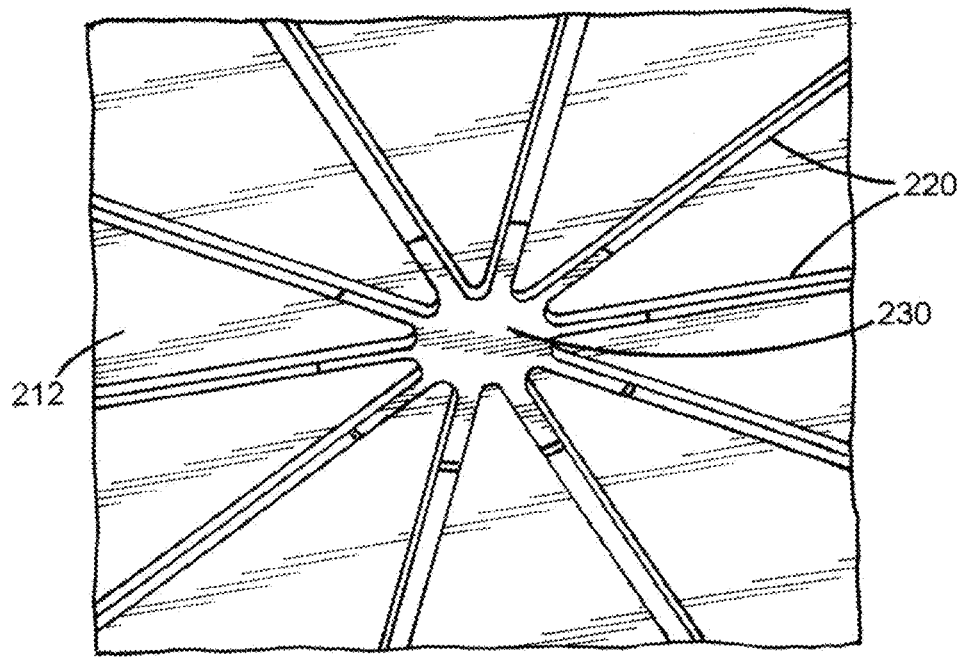
FIG. 6 illustrates the pizza pan of FIG. 5 in close up, illustrating the reinforced slot junction in detail, in accordance with the present disclosure.

FIG. 6 illustrates the pizza pan of FIG. 5 in close up, illustrating the reinforced slot junction in detail. Guidelines 220 embodied as through slots cut or formed into pan 210. Reinforced slot junction 230 is formed, wherein the indented slots forming guidelines 220 overlap.

Figure 7:
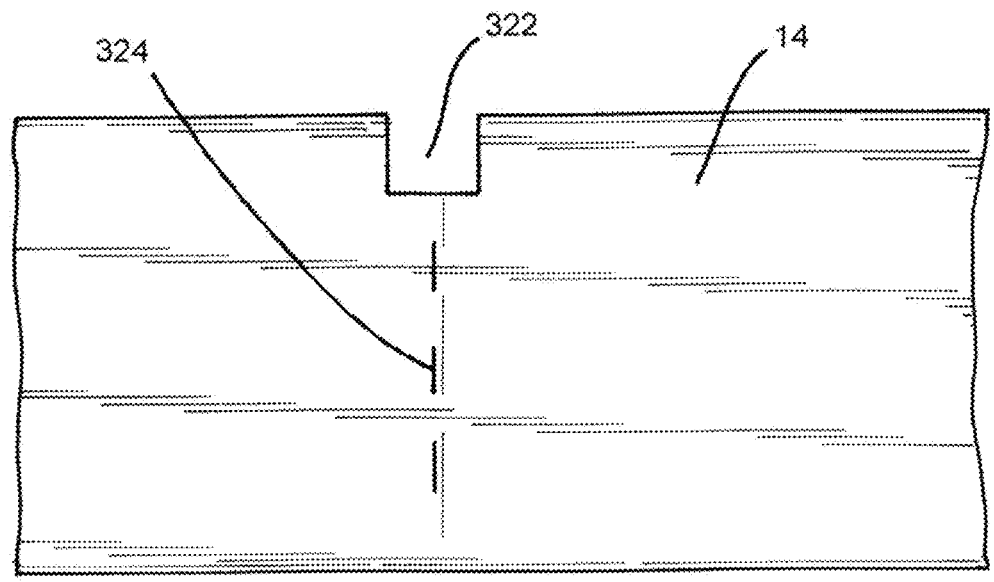
FIG. 7 illustrates the pizza pan of FIG. 1 including an exemplary visible guideline locator on a wall of the pan, the visible guideline locator including a cut out notch, in accordance with the present disclosure.

FIG. 7 illustrates the pizza pan of FIG. 1 including an exemplary visible guideline locator on a wall of the pan, the visible guideline locator including a cut out notch. Wall 14 is illustrated including bend 324 forming an angle in the perimeter of the pan. Notch 322 is illustrated, configured to accept a sharpened edge of a pizza cutter, aligning the pizza cutter with a guideline 20 formed in the pan just below notch 322.

Figure 8:
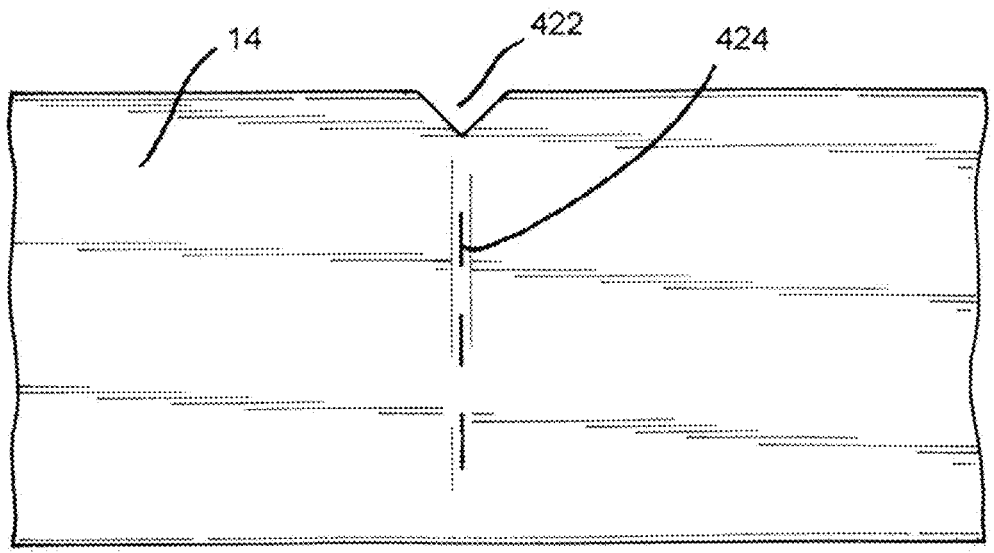
FIG. 8 illustrates the pizza pan of FIG. 1 including an exemplary visible guideline locator on a wall of the pan, the visible guideline locator including a V-shaped indentation, in accordance with the present disclosure.

FIG. 8 illustrates the pizza pan of FIG. 1 including an exemplary visible guideline locator on a wall of the pan, the visible guideline locator including a V-shaped indentation. Wall 14 is illustrated including bend 424 forming an angle in the perimeter of the pan. V-shaped indentation 422 is illustrated, configured to accept a sharpened edge of a pizza cutter, aligning the pizza cutter with a guideline 20 formed in the pan just below indentation 422.

Figure 9:
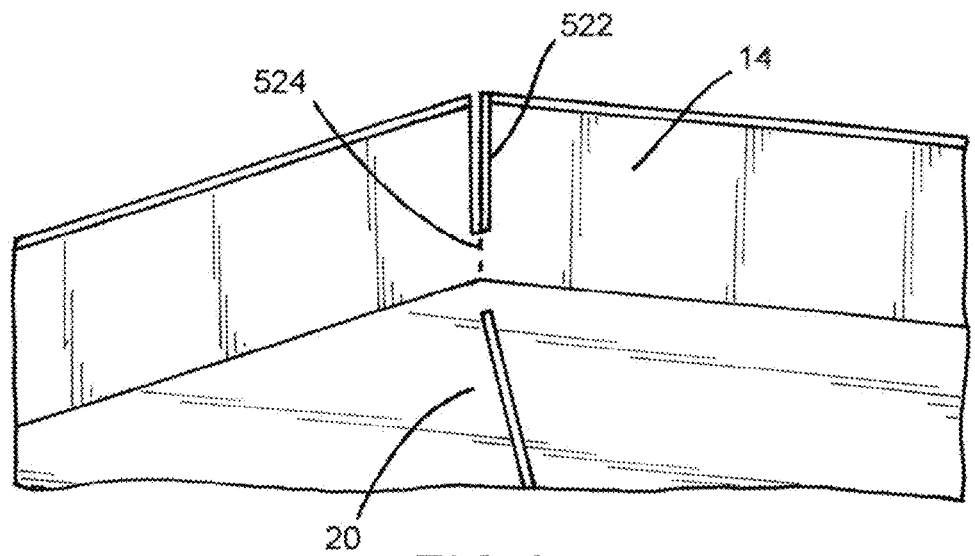
FIG. 9 illustrates the pizza pan of FIG. 1 including an exemplary visible guideline locator on a wall of the pan, the visible guideline locator including a slot extending down a majority of the wall, in accordance with the present disclosure.

FIG. 9 illustrates the pizza pan of FIG. 1 including an exemplary visible guideline locator on a wall of the pan, the visible guideline locator including a slot extending down a majority of the wall. Wall 14 is illustrated including bend 524 forming an angle in the perimeter of the pan. Slot 522 is illustrated, configured to accept a sharpened edge of a pizza cutter, aligning the pizza cutter with a guideline 20 formed in the pan just below slot 522. Slot 522, in extending down a majority of the wall, enables one to cut through a significant portion of the side crust of the pizza, with the pizza cutter unable to cut only a small portion of the pizza crust between slot 522 and guideline 20.

Figure 10:
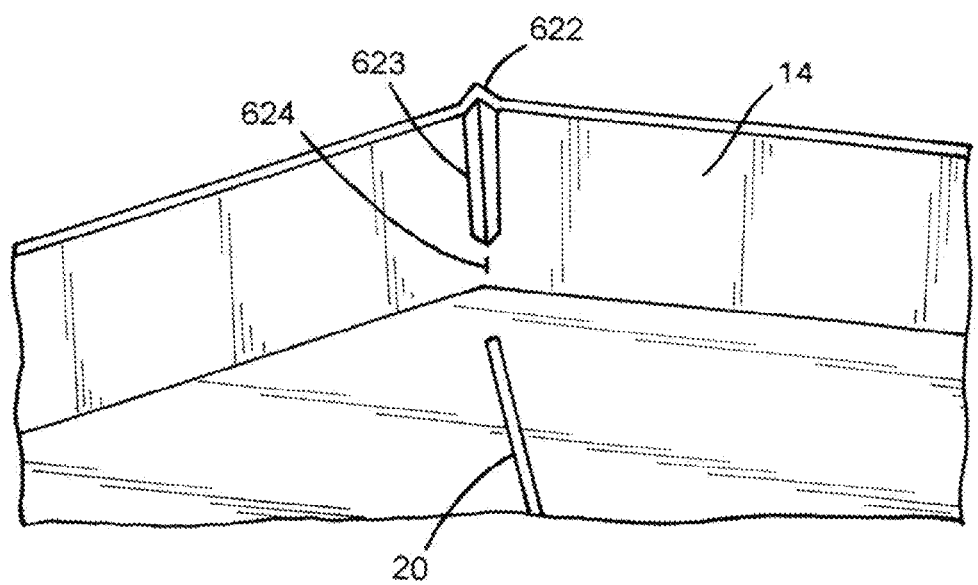
FIG. 10 illustrates the pizza pan of FIG. 1 including an exemplary visible guideline locator on a wall of the pan, the visible guideline locator including an indentation extending down a majority of the wall, in accordance with the present disclosure.

FIG. 10 illustrates the pizza pan of FIG. 1 including an exemplary visible guideline locator on a wall of the pan, the visible guideline locator including an indentation extending down a majority of the wall. Wall 14 is illustrated including bend 624 forming an angle in the perimeter of the pan. Indentation 623 is illustrated, configured to accept a sharpened edge of a pizza cutter, aligning the pizza cutter with a guideline 20 formed in the pan just below indentation 623. Indentation 623 includes a V-shaped notch 622 formed in a top of wall 14.

Figure 11:
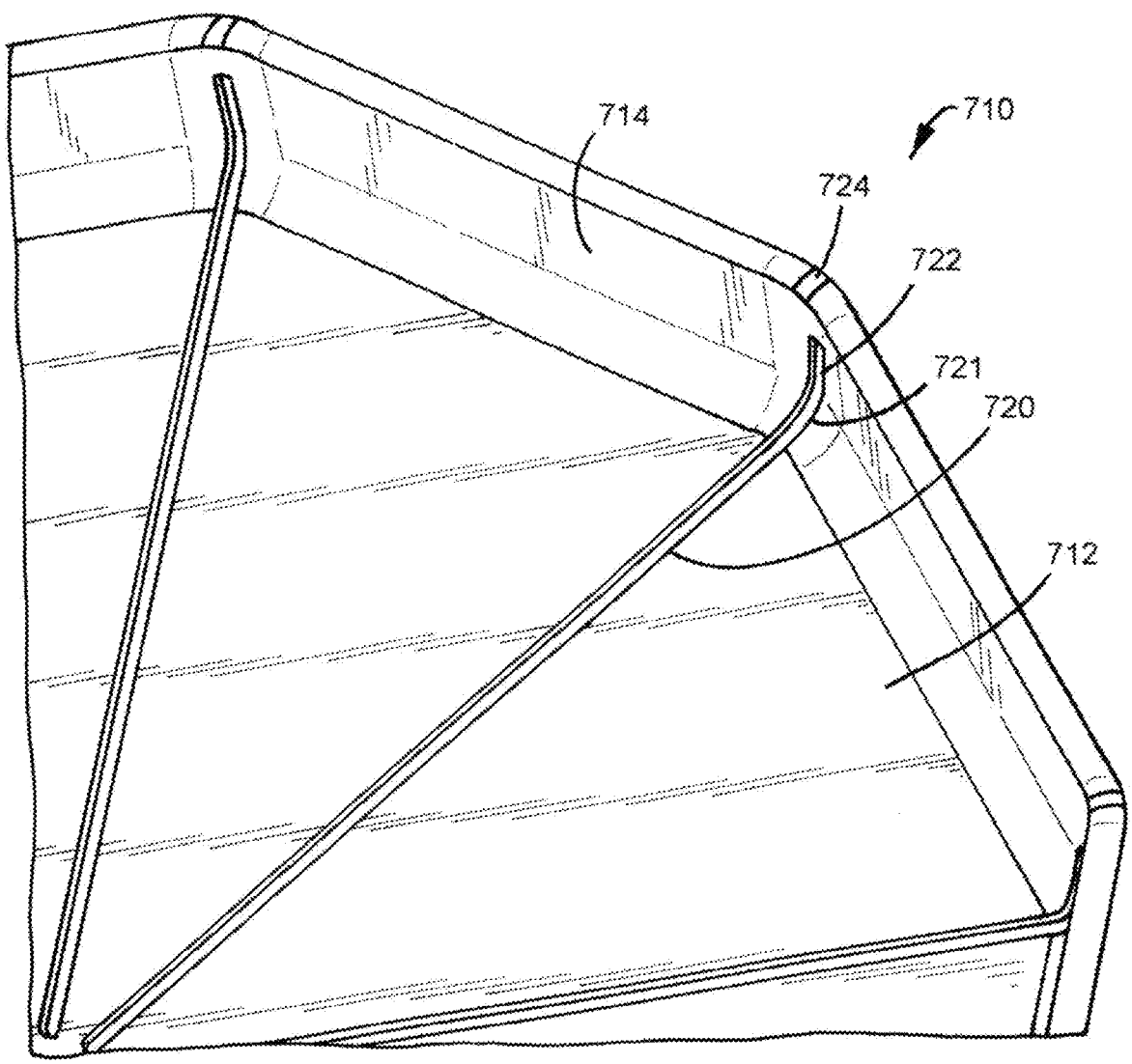
FIG. 11 illustrates an exemplary alternative pizza pan including guidelines formed in a flat base of the pan and visible guideline locators on walls of the pan, the guidelines including through slots in the flat base where the guidelines extend up the walls and the ends of the slots extend high enough to form the visible guideline locators, in accordance with the present disclosure.

FIG. 11 illustrates an exemplary alternative pizza pan including guidelines formed in a flat base of the pan and visible guideline locators on walls of the pan, the guidelines including through slots in the flat base where the guidelines extend up the walls and the ends of the slots extend high enough to form the visible guideline locators. Pizza pan 710 is illustrated including a flat base 712 and walls 714. Guidelines 720 are illustrated a through slots cut into flat base 712. Guidelines 720 extend up walls 714, including rounded section 721 and vertical section 722. An end of vertical section 722 can be high enough on the wall to be visible to the user, thereby serving as the visible guideline locator for the pan. In one embodiment, no other visible notch or indentation is formed on wall 714. In the embodiment of FIG. 11, additional notches 724 are located atop wall 714 above guidelines 720 to further aid the user in correctly locating the pizza cutter to the pan.

Figure 12:
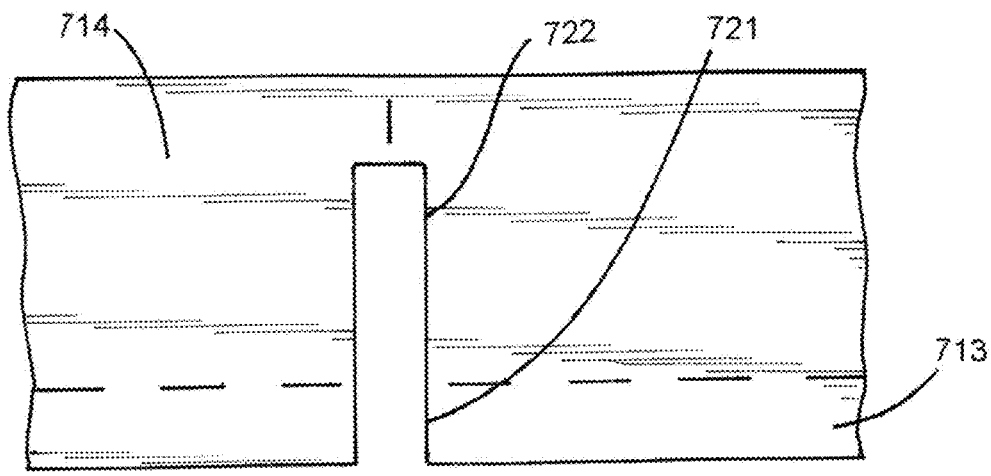
FIG. 12 illustrates the pizza pan of FIG. 11, illustrating in close up detail the slots extending up the wall of the pan, in accordance with the present disclosure.

FIG. 12 illustrates the pizza pan of FIG. 11, illustrating in close up detail the slots extending up the wall of the pan. Wall 714 is illustrated including a rounded wall base 713, transitioning wall 174 with a flat base. In another embodiment wall 174 can include a substantially right angle transition with a flat base, and a slot could similarly be cut across the transition, extending from the flat base up the wall. In FIG. 12, rounded section 721 and vertical section 722 of the guideline extending up wall 714 are illustrated.

A number of different guideline configurations are disclosed herein. A number of different visible guideline locators are disclosed herein. It will be appreciated that various different guidelines and visible guideline locators can be interchangeably used upon a pizza pan in accordance with the pizza pan of the disclosure, and the disclosure is not intended to be limited to the particular combinations illustrated in the figures.

FIGS. 13-17 illustrate exemplary pizza pans similar to the pizza pan of FIG. 1, with different pan profiles each including guidelines formed in a flat base of the pan and visible guideline locators on walls of the pan. Any combination of guideline and visible guideline locator features disclosed or contemplated herein can be used upon the pans of FIGS. 13-17.

Figure 13:
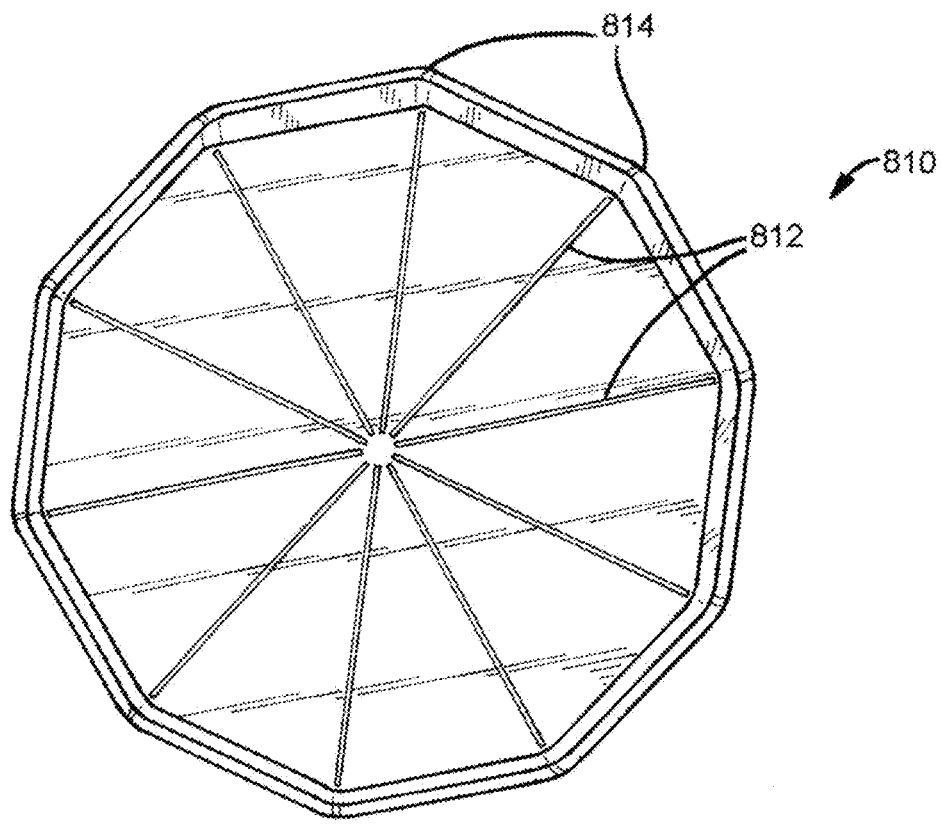
FIGS. 13-17 illustrate exemplary pizza pans similar to the pizza pan of FIG. 1, with different pan profiles each including guidelines formed in a flat base of the pan and visible guideline locators on walls of the pan, in accordance with the present disclosure.

FIG. 13 illustrates a pan in the form of a decagon. Pizza pan 810 is illustrated, including guidelines 812 and visible guideline locators 814. Any polygon, including five, six, ten or twelve sides can be used to form a pizza pan in accordance with the present disclosure, and the disclosure is not intended to be limited to the particular configurations illustrated in the figures.

Figure 14:
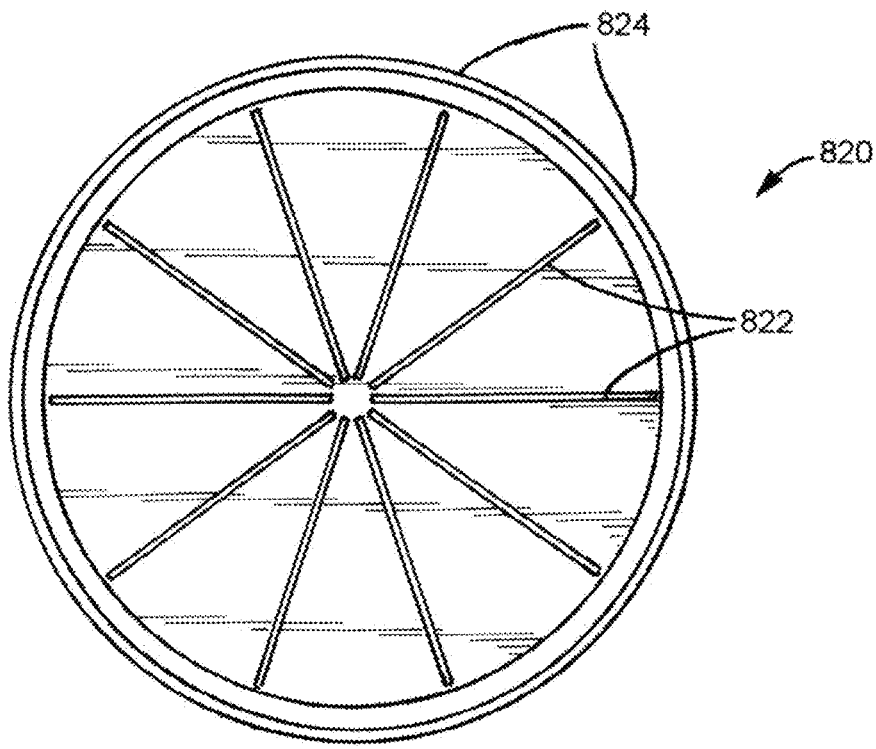

FIG. 14 illustrates a pan in the form of a circle. Pizza pan 820 is illustrated including guidelines 822 and visible guideline locators 824.

Figure 15:
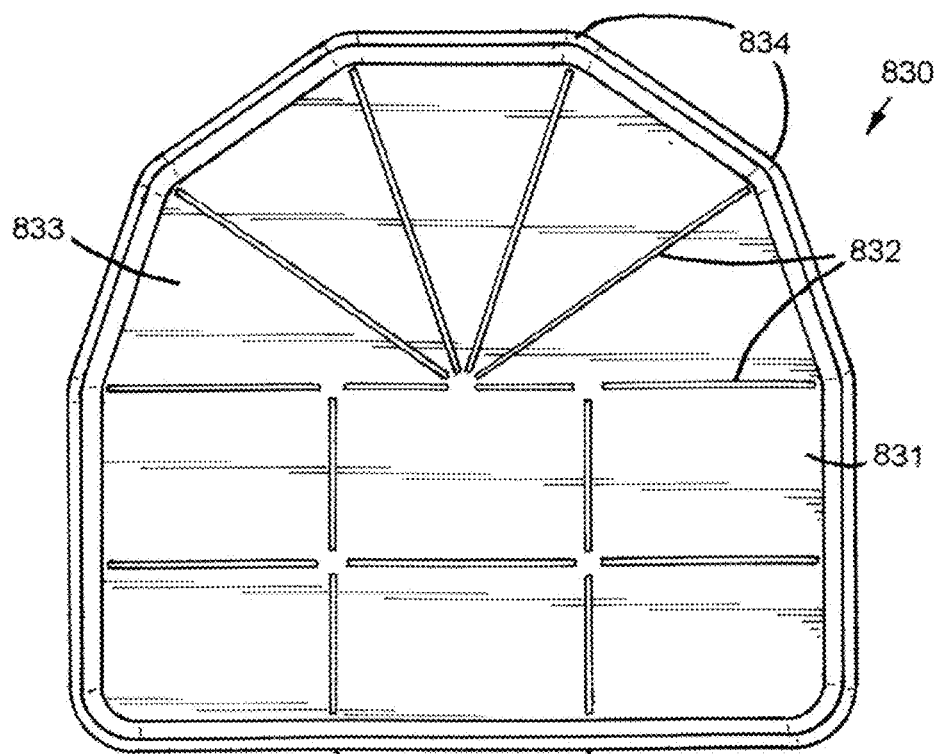

FIG. 15 illustrates a pan with a rectangular portion and a half of a decagon portion. Pizza pan 830 is illustrated including half decagon portion 833, rectangular portion 831, guidelines 832, and visible guideline locators 834. Instead of having one center of the pan at which the guidelines converge, the rectangular portion includes a number of regions at which the guidelines converge and the pan material is connected to maintain stability of the pan. Portion 833 can be replaced by a portion of any polygon, for example, including half of a square cut diagonally, half of a pentagon, hexagon, hendecagon (having eleven sides), or dodecagon (having twelve sides.) Likewise, rectangular portion 831 can be replaced by any polygon, for example, including a hemispherical half circle.

Figure 16:
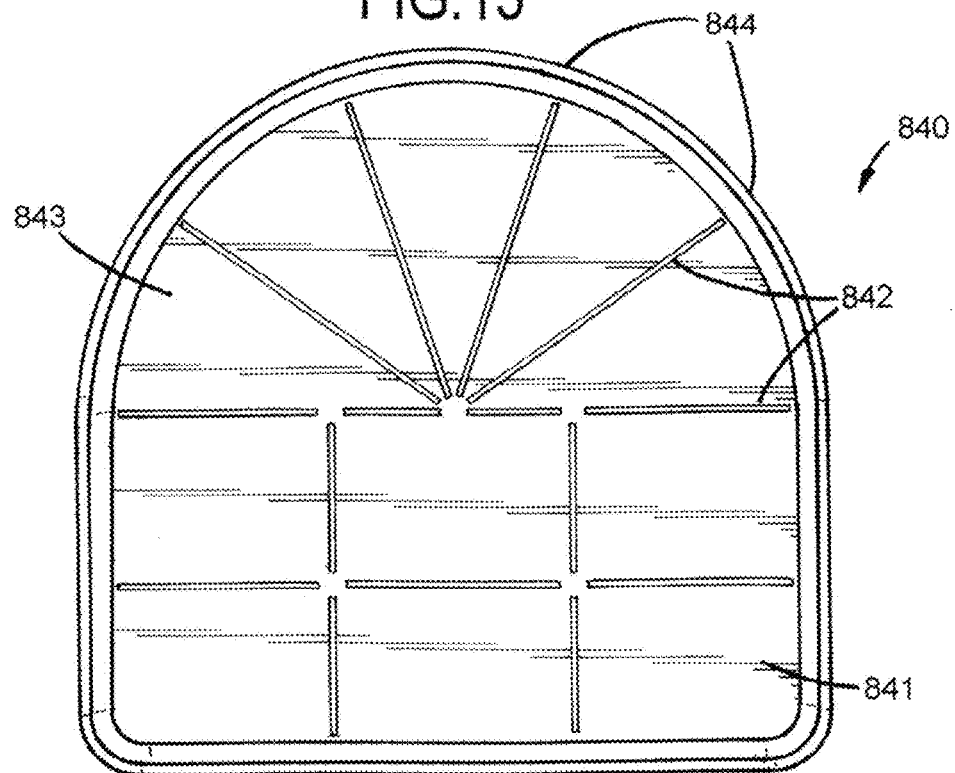

FIG. 16 illustrates a pan with a rectangular portion and a hemispherical portion. Pizza pan 840 is illustrated including hemispherical portion 843, rectangular portion 841, guidelines 842, and visible guideline locators 844. Instead of having one center of the pan at which the guidelines converge, the rectangular portion includes a number of regions at which the guidelines converge and the pan material is connected to maintain stability of the pan.

Figure 17:
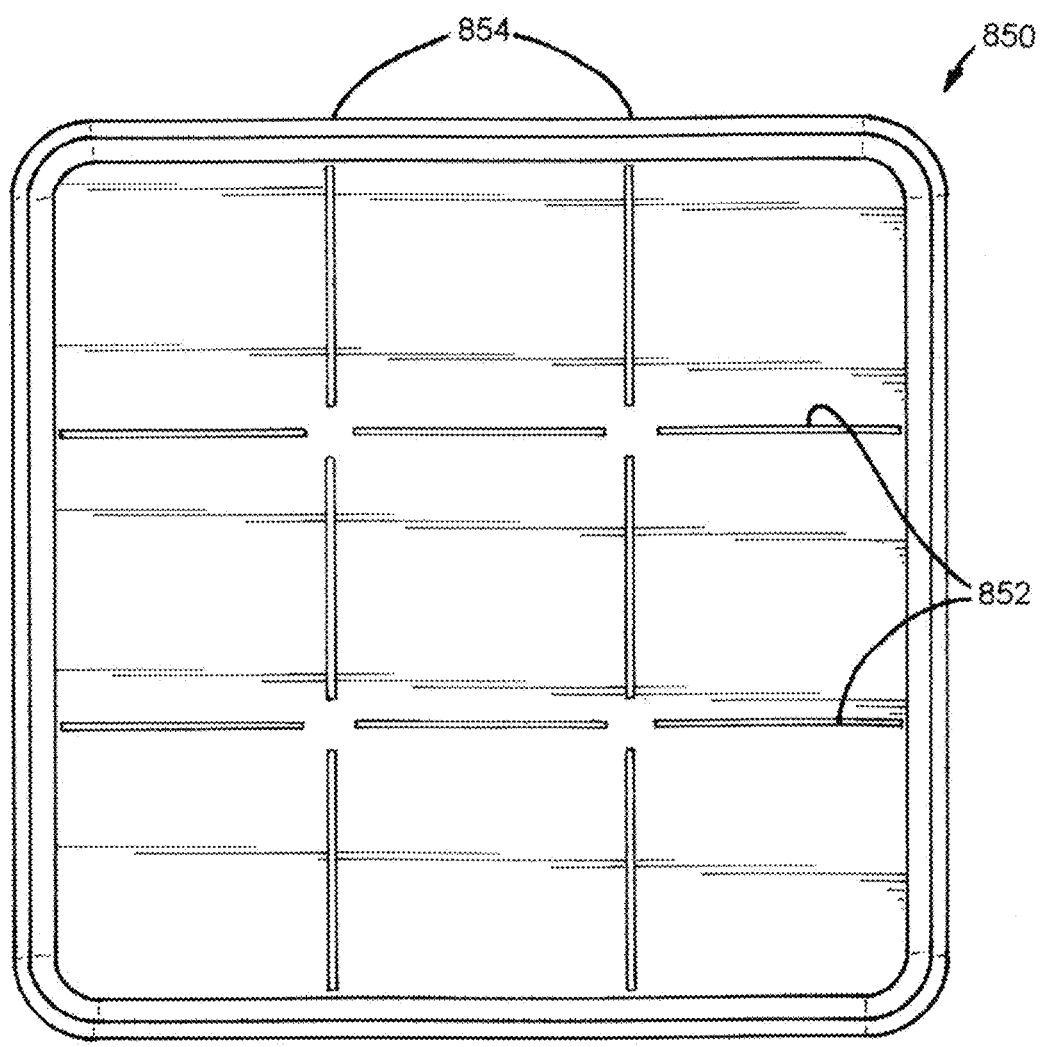

FIG. 17 illustrates a pan with a square profile. Pizza pan 850 is illustrated including guidelines 852 and visible guideline locators 854. Instead of having one center of the pan at which the guidelines converge, the rectangular pan includes a number of regions at which the guidelines converge and the pan material is connected to maintain stability of the pan. According to the embodiment of FIG. 17, a polygonal pizza pan can include guidelines extending from midpoints of walls of the pan to a plurality of guideline junctions.

Figure 18:
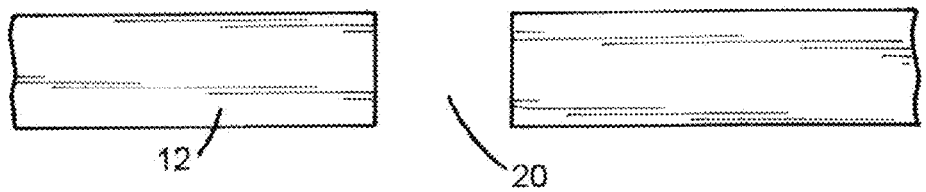
FIGS. 18-21 illustrate exemplary profiles for guidelines, in accordance with the present disclosure.

FIG. 18 illustrates the guideline of FIG. 1 in profile. Flat base 12 is illustrated showing guideline 20 embodied as a through slot 20. A through slot includes any slot providing an opening in the material of the pan. In this embodiment, the flat base material could be machined or punched away.

Figure 19:
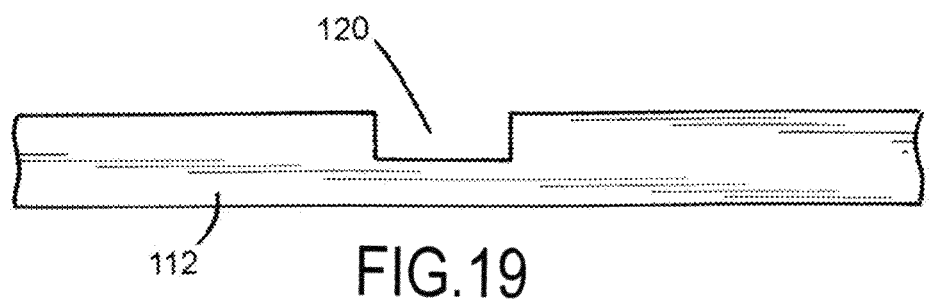

FIG. 19 illustrates the guideline of FIG. 3 in profile. Flat base 112 is illustrated showing guideline 120 as a slot not going entirely through flat base 112. In this example, the material of flat base 112 can be machined away to create the slot.

Figure 20:
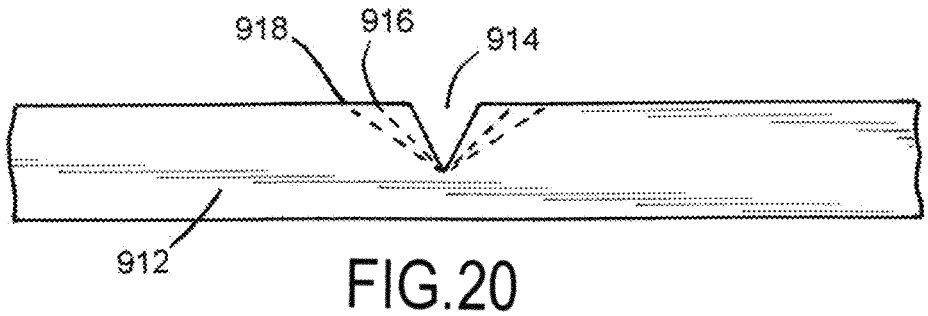

FIG. 20 illustrates an exemplary alternative guideline in profile including a machined V-shaped guideline. Flat base 912 is illustrated showing guideline 914 including a V-shaped profile. Such a profile can be advantageous for providing a sharpened pizza cutter with a precise shape in which to seat, the sharpened edge of the cutter mating with the narrow end of the V-shaped slot. Lines 916 and 918 are illustrated showing different exemplary angles that can be used to create guideline 914.

Figure 21:
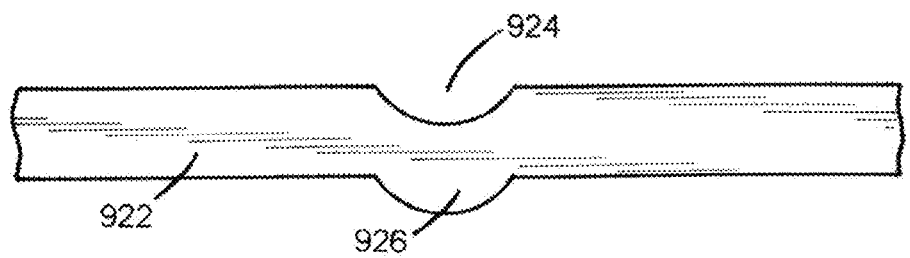

FIG. 21 illustrates an exemplary additional alternative guideline in profile including a pressed rounded guideline. Flat base 922 is illustrated including rounded guideline 924 pressed into the material of flat base 922. Material 926 of flat base 922 is displaced/protrudes from a bottom surface of flat base 922. Guideline 924 can, for example, be created in a single step with the pan being pressed into shape from a flat piece of metal.

Figure 22:
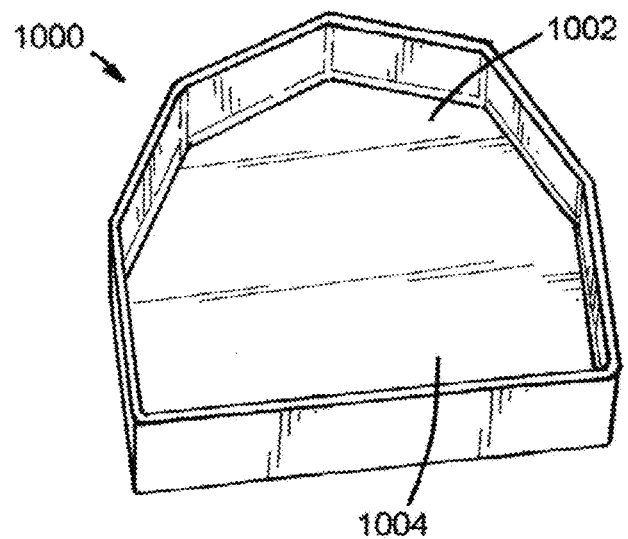
FIG. 22 illustrates an exemplary pizza pan including a rectangular portion and a half of an octagon portion, in accordance with the present disclosure.

FIG. 22 illustrates an exemplary pizza pan including a rectangular portion and a half of an octagon portion. Even without guidelines provided with other embodiments of the disclosure, a pan with the outline of the pan of FIG. 22 can aid in precisely cutting a pizza. The exemplary pan 1000 of FIG. 22 enables one to cut a plurality of rectangular pizza slices within the rectangular portion 1004 of the pan and a plurality of wedge shaped slices within half octagon portion 1002 of the pan. In one embodiment of the disclosure, a thickened wall section or thermally resistive plate can be inserted or provide between portion 1002 and the pizza crust, such that a thinner crust can be cooked in portion 1002 and a thicker crust can be cooked in portion 1004, with the increased thermal resistivity of portion 1002 allowing the thinner crust to cook relatively more slowly.

Figure 23:
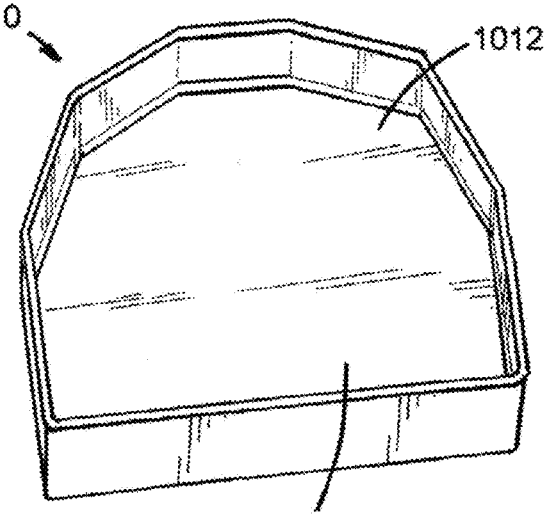
FIG. 23 illustrates an exemplary pizza pan including a rectangular portion and a half of a decagon portion, in accordance with the present disclosure.

FIG. 23 illustrates an exemplary pizza pan including a rectangular portion and a half of a decagon portion. The exemplary pan 1010 of FIG. 23 enables one to cut a plurality of rectangular pizza slices within the rectangular portion 1014 of the pan and a plurality of wedge shaped slices within half decagon portion 1012 of the pan.

Figure 24:
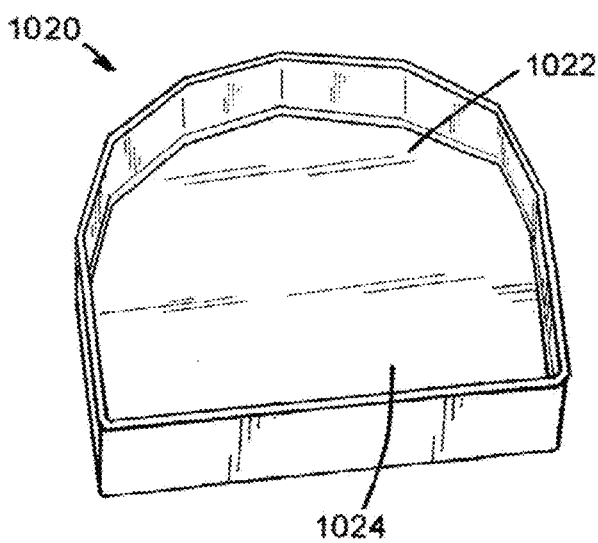
FIG. 24 illustrates an exemplary pizza pan including a rectangular portion and a half of a dodecagon portion, in accordance with the present disclosure.

FIG. 24 illustrates an exemplary pizza pan including a rectangular portion and a half of a dodecagon portion. The exemplary pan 1020 of FIG. 24 enables one to cut a plurality of rectangular pizza slices within the rectangular portion 1024 of the pan and a plurality of wedge shaped slices within half decagon portion 1022 of the pan. FIGS. 22-24 are intended as exemplary, with any of a number of other half and half shapes being envisioned in the pizza pan.

Figure 25:
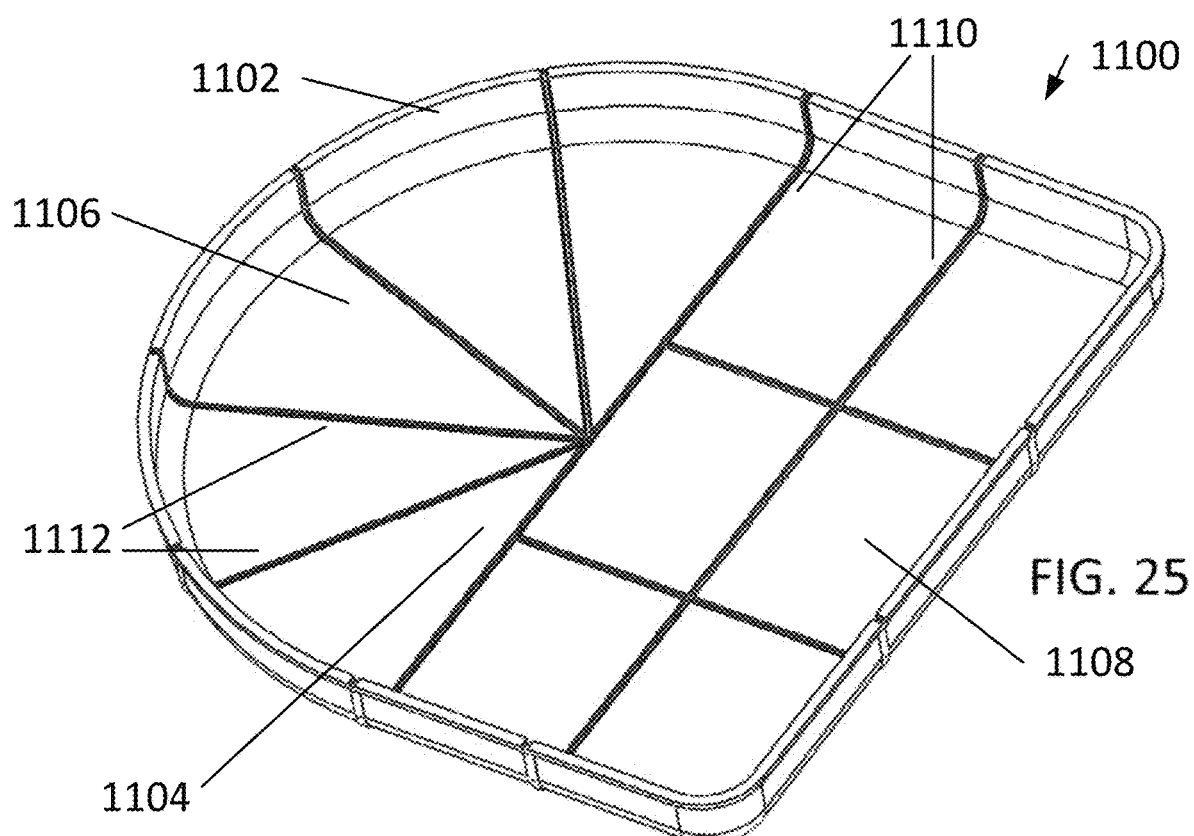
FIG. 25 illustrates an exemplary pizza pan with a rectangular portion and a hemispherical portion, with guidelines extending contiguously from a flat base portion, up sides of the pan, and onto a rim of the pan, in accordance with the present disclosure.

FIG. 25 illustrates an exemplary pizza pan with a rectangular portion and a hemispherical portion, with guidelines extending contiguously from a flat base portion, up sides of the pan, and onto a rim of the pan. Pizza pan 1100 is illustrated including raised walls 1102 surrounding a flat base 1104. Pan 1100 includes rectangular portion 1108 and hemispherical portion 1106. Pan 1100 includes a plurality of cutting guidelines 1110 dividing flat base 1104 into rectangular sections and a plurality of cutting guidelines 1112 dividing base 1104 into triangular pie-shaped sections. The guidelines 1110 and 1112 extend contiguously from flat base 1104, up sides 1102, and onto a rim of pan 1110. Guidelines 1110 and 1112, as seen from a top perspective view, include depressed grooves in pan 1100 configured to accept the blade of an exemplary pizza cutting tool known in the art.

Figure 26:
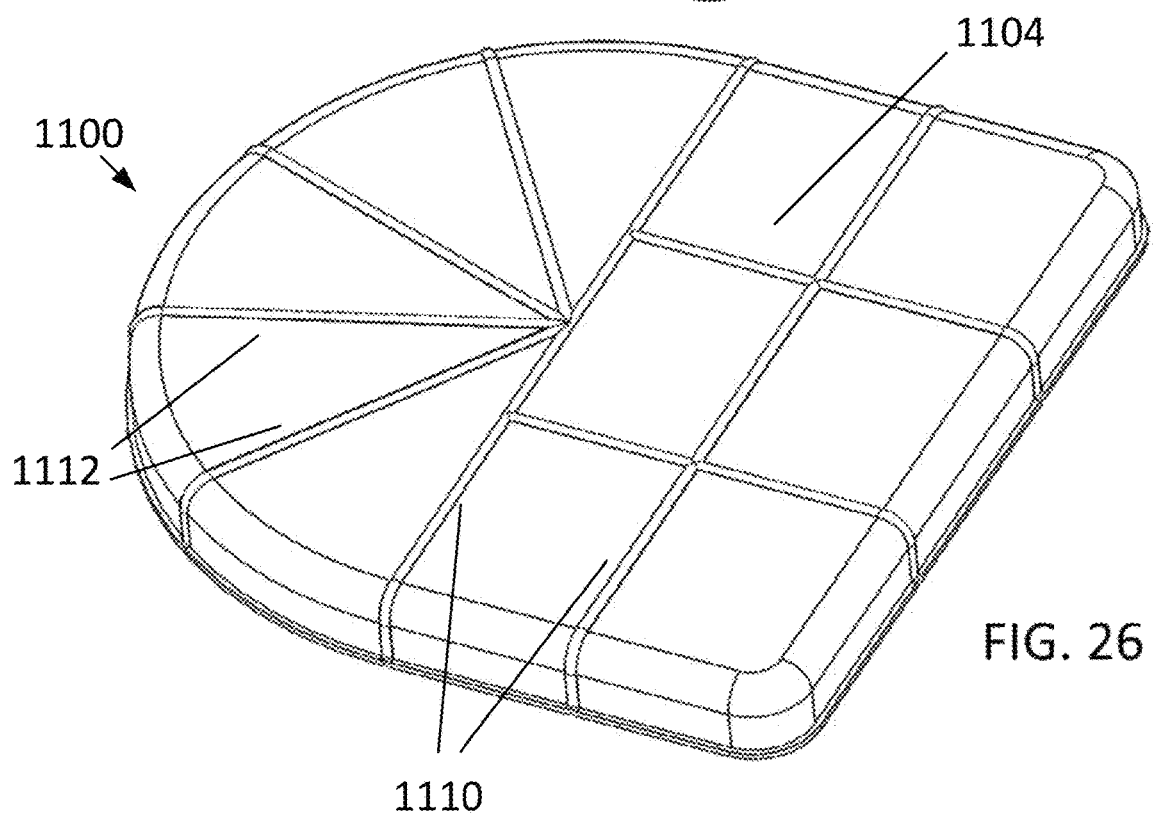
FIG. 26 illustrates the pizza pan of FIG. 25 from a bottom perspective view, in accordance with the present disclosure.

FIG. 26 illustrates the pizza pan of FIG. 25 from a bottom perspective view. Pan 1100 is illustrated including flat base 1104 and guidelines 1110 and 1112. Guidelines 1110 and 1112, as seen from a bottom perspective view, include raised grooves on pan 1100.

Figure 27:
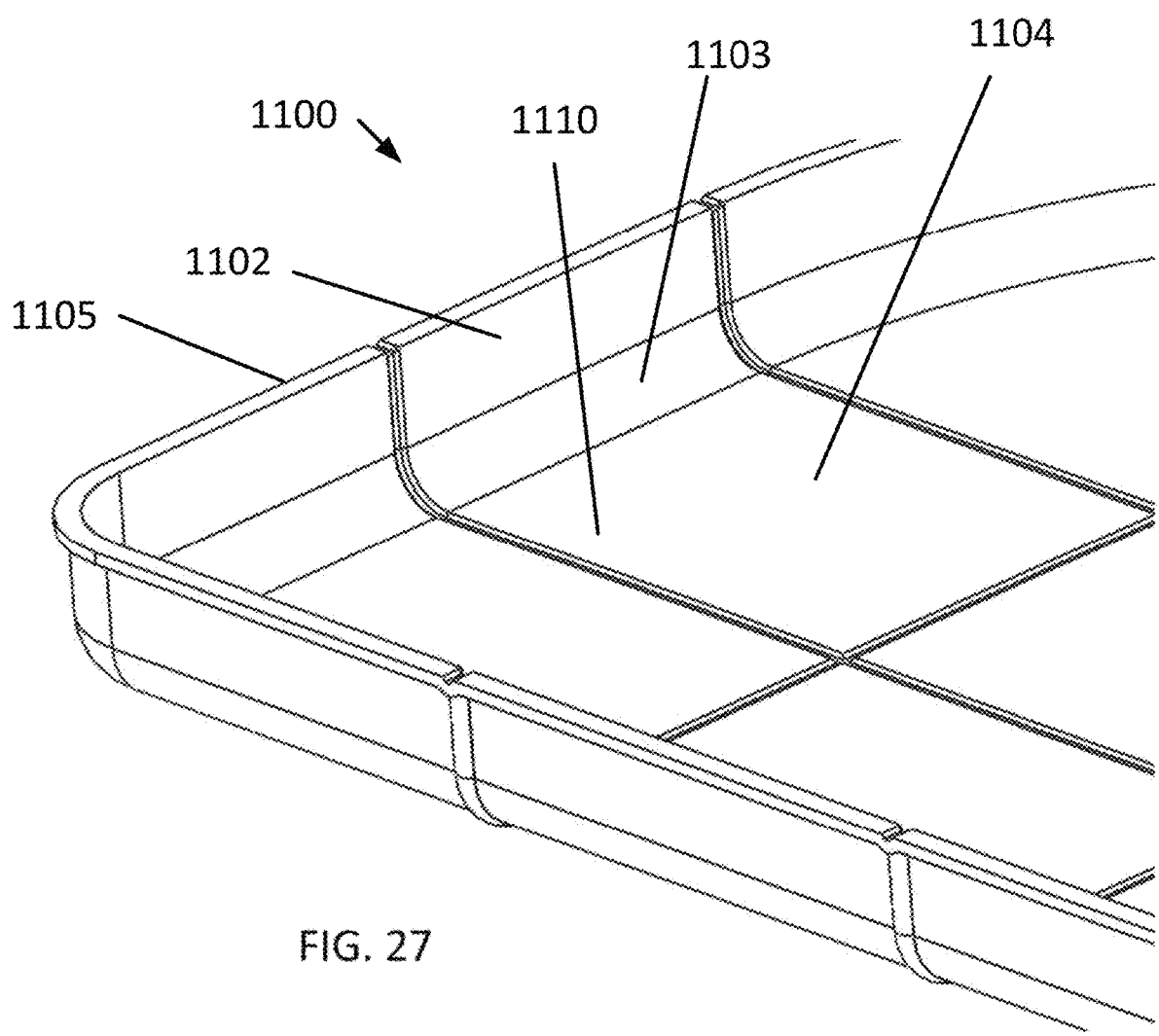
FIG. 27 illustrates the pizza pan of FIG. 25 in greater detail, in accordance with the present disclosure.

FIG. 27 illustrates the pizza pan of FIG. 25 in greater detail. Pizza pan 1100 is illustrated including flat base 1104, raised walls 1102, curved transition 1103 connecting raised walls 1102 to flat base 1104, and pan rim 1105. Guidelines 1110 are illustrated extending contiguously from flat base 1104, across curved transition 1103, up raised walls 1102, and onto pan rim 1105. By extending the guidelines 1110 contiguously from the rim 1105 onto the flat base 1104, one can see on the rim where the guidelines 1110 run under the pizza in the pan, and as the pizza cutter moves from the rim, through the pizza, and along the flat base of the pan, the contiguous guideline guides the cutter blade efficiently along an entire cut in the pizza.

Figure 28:
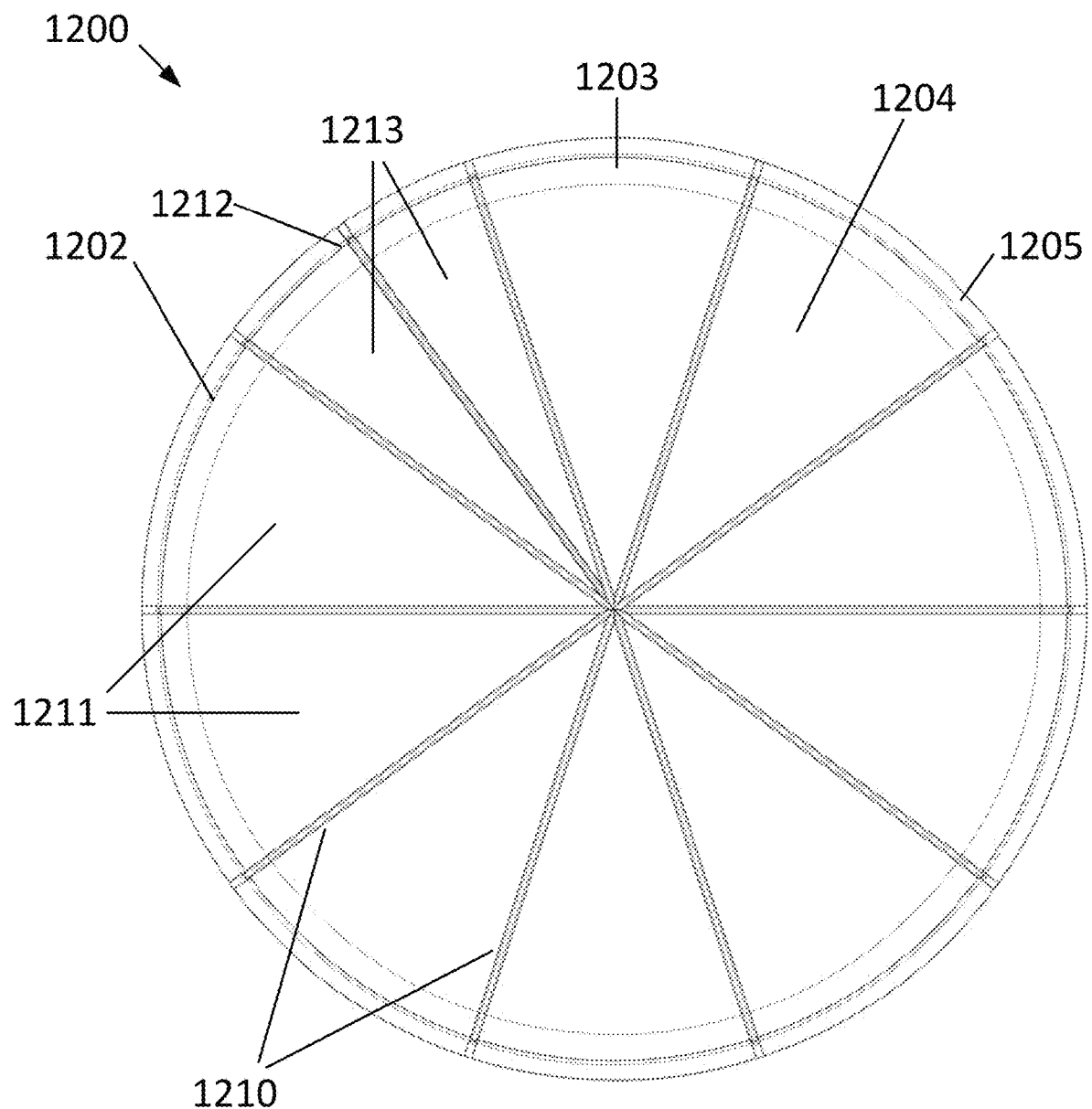
FIG. 28 illustrates an exemplary circular pizza pan, with guidelines extending contiguously from a flat base portion, up sides of the pan, and onto a rim of the pan, in accordance with the present disclosure.

FIG. 28 illustrates an exemplary circular pizza pan, with guidelines extending contiguously from a flat base portion, up sides of the pan, and onto a rim of the pan. Pizza pan 1200 is illustrated, including flat base 1204 surrounded by raised walls 1202. Curved transitions 1203 are illustrated connecting flat base 1204 to raised walls 1202. Rim 1205 is illustrated around a top of raised walls 1202. A plurality of cutting guidelines 1210 are illustrated dividing pizza pan 1200 into a plurality of triangular pie-shaped sections 1211. Guidelines 1210 are illustrated extending contiguously from flat base 1204, across curved transition 1203, up raised walls 1202, and onto pan rim 1205.

An optional guideline 1212 is illustrated extending contiguously from flat base 1204, across curved transition 1203, up raised walls 1202, and onto pan rim 1205. Guideline 1212 is configured to subdivide one of the pie-shaped sections 1211 into two smaller pie-shaped sections 1213. This optional construction can be used to market a pizza pan 1200 configured to provide lower-calorie portions of pizza.

FIGS. 29 and 30 illustrate in side view the pizza pan of FIG. 28. Pizza pan 1200 is illustrated including flat base 1204, raised walls 1202, curved transition 1203 connecting raised walls 1202 to flat base 1204, and pan rim 1205. Guidelines 1210 are illustrated extending contiguously from flat base 1204, across curved transition 1203, up raised walls 1202, and onto pan rim 1205. By extending the guidelines 1210 contiguously from the rim 1205 onto the flat base 1204, one can see on the rim where the guidelines 1210 run under the pizza in the pan, and as the pizza cutter moves from the rim, through the pizza, and along the flat base of the pan, the contiguous guideline guides the cutter blade efficiently along an entire cut in the pizza.

Figure 31:
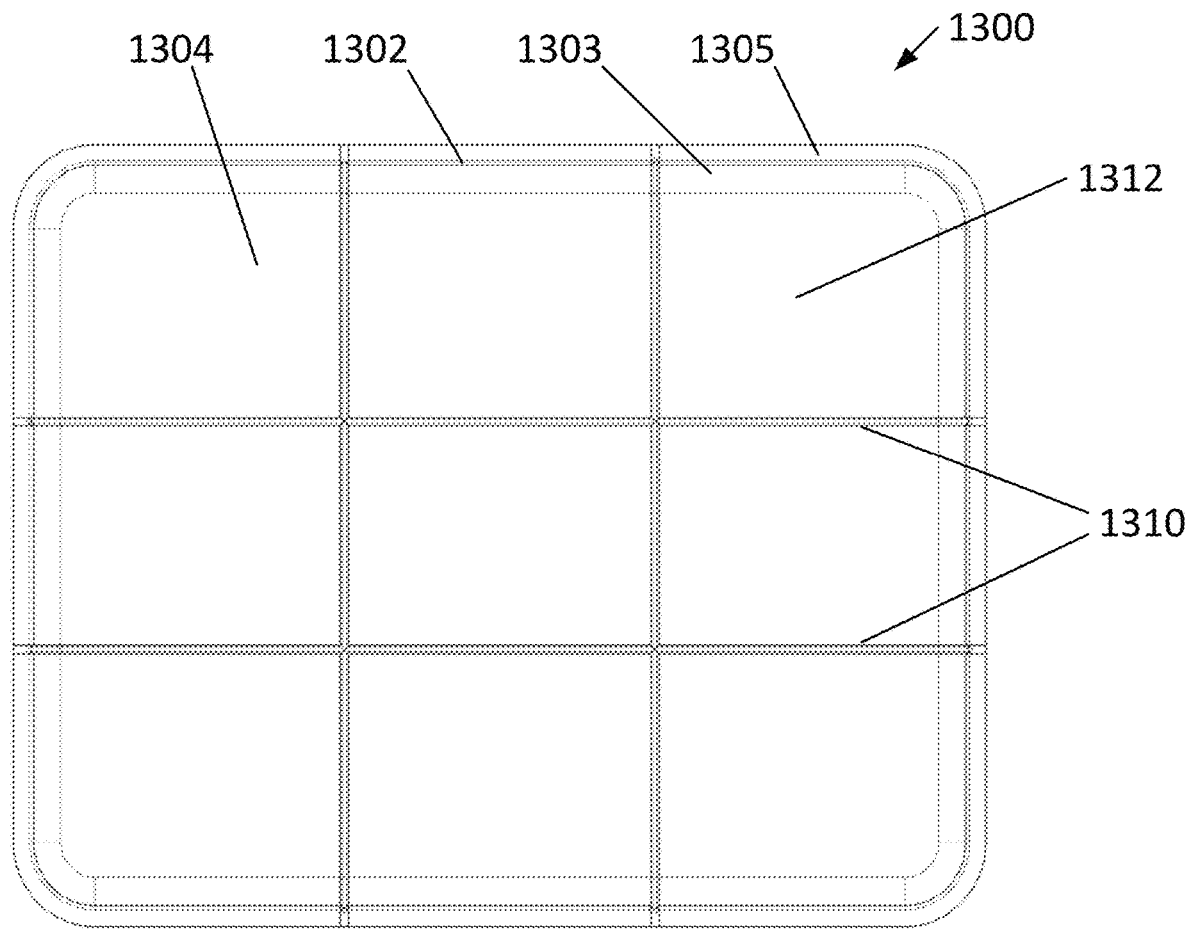
FIG. 31 illustrates an exemplary rectangular pizza pan, with guidelines extending contiguously from a flat base portion, up sides of the pan, and onto a rim of the pan, in accordance with the present disclosure.

FIG. 31 illustrates an exemplary rectangular pizza pan, with guidelines extending contiguously from a flat base portion, up sides of the pan, and onto a rim of the pan. Pizza pan 1300 is illustrated, including flat base 1304 surrounded by raised walls 1302. Curved transitions 1303 are illustrated connecting flat base 1304 to raised walls 1302. Rim 1305 is illustrated around a top of raised walls 1302. A plurality of cutting guidelines 1310 are illustrated dividing pizza pan 1300 into a plurality of rectangle-shaped sections 1312. Guidelines 1310 are illustrated extending contiguously from flat base 1304, across curved transition 1303, up raised walls 1302, and onto pan rim 1305.

Figure 32:
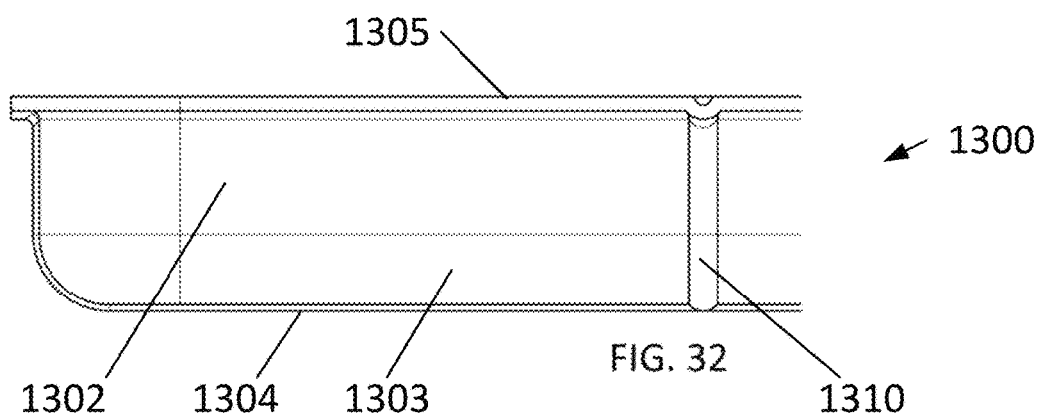
FIG. 32 illustrates in side view the pizza pan of FIG. 31, in accordance with the present disclosure.

FIG. 32 illustrates in side view the pizza pan of FIG. 31. Pizza pan 1300 is illustrated including flat base 1304, raised walls 1302, curved transition 1303 connecting raised walls 1302 to flat base 1304, and pan rim 1305. Guidelines 1310 are illustrated extending contiguously from flat base 1304, across curved transition 1303, up raised walls 1302, and onto pan rim 1305. By extending the guidelines 1310 contiguously from the rim 1305 onto the flat base 1304, one can see on the rim where the guidelines 1310 run under the pizza in the pan, and as the pizza cutter moves from the rim, through the pizza, and along the flat base of the pan, the contiguous guideline guides the cutter blade efficiently along an entire cut in the pizza.

Curved transitions can exist between the flat base portion and the raised walls. However, in other embodiments, the flat base can join the raised walls with a small curved section or a square bend in the pan.

Figure 33:
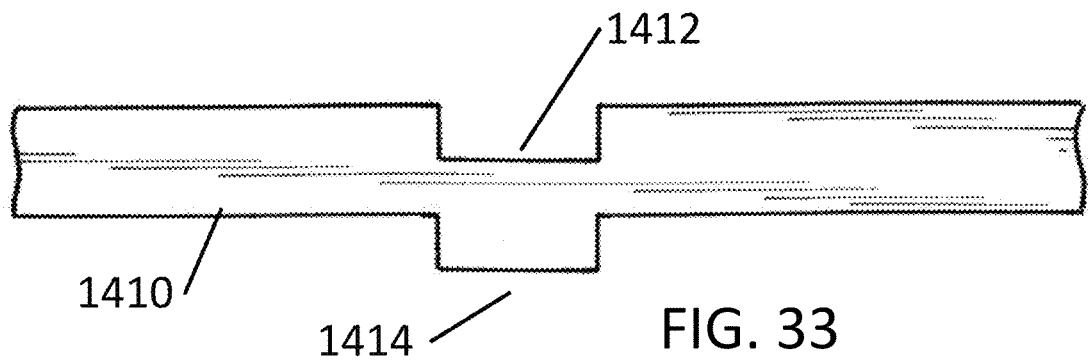
FIGS. 33-36 illustrate additional exemplary profiles for guidelines, in accordance with the present disclosure.
Figure 34:
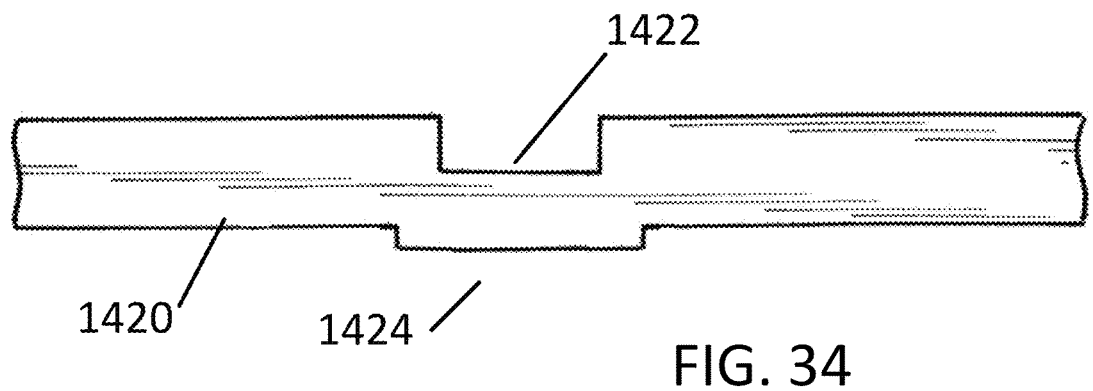

FIGS. 33-36 illustrate additional exemplary profiles for guidelines in profile. FIG. 33 illustrates flat base 1410 including a guideline 1412 in profile including a rectangle-shaped groove with a matching extending portion 1414 protruding from a bottom side of flat base 1410. FIG. 34 illustrates flat base 1420 including a guideline 1422 in profile including a rectangle-shaped groove with a widened rectangle-shaped extending portion 1424 protruding from a bottom side of flat base 1420.

Figure 35:
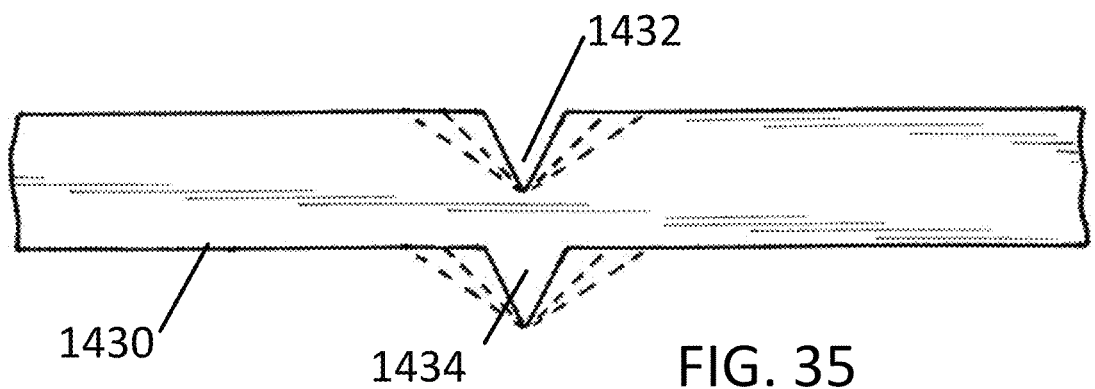
Figure 36:
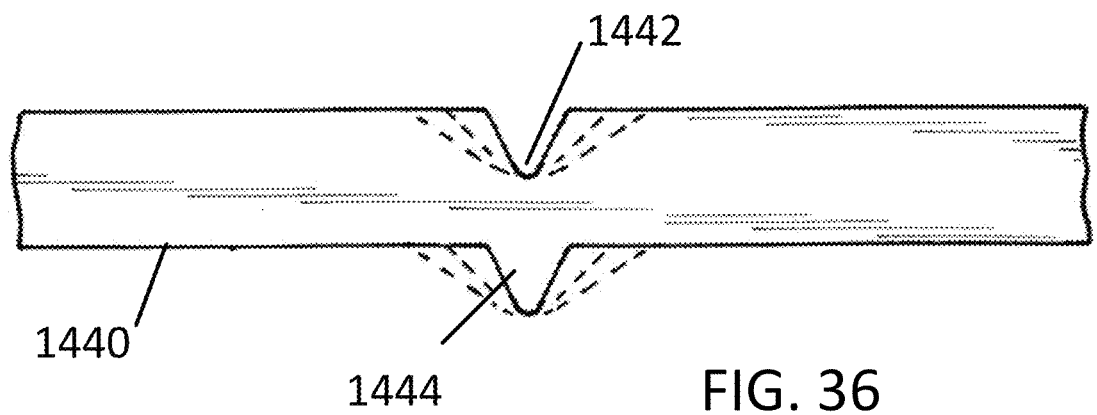

FIG. 35 illustrates an exemplary alternative guideline in profile including a V-shaped guideline. Flat base 1430 is illustrated showing guideline 1432 including a V-shaped profile. A matching or similar V-shaped extending portion 1434 is illustrated on a bottom side of flat base 1430. Dotted lines are illustrated showing different exemplary angles that can be used to create guideline 1432 and the extending portion 1434 on the bottom side of flat base 1430. FIG. 36 illustrates an exemplary alternative guideline in profile including a V-shaped guideline similar to the guideline of FIG. 35, except that the V-shaped profile includes a rounded bottom. Flat base 1440 is illustrated showing guideline 1442 including a V-shaped profile with a rounded bottom. A matching or similar V-shaped extending portion 1444 with a rounded bottom is illustrated on a bottom side of flat base 1440. Dotted lines are illustrated showing different exemplary angles that can be used to create guideline 1442 and the extending portion 1444 on the bottom side of flat base 1440.

Figure 37:
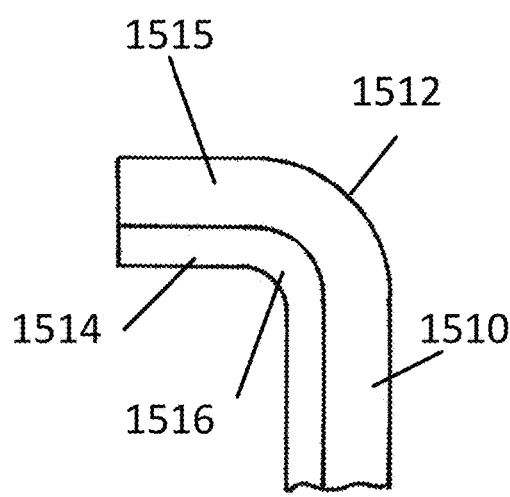
FIGS. 37-42 illustrate exemplary profiles of pizza pan rims, each with a guideline extending up a side of the pan to the rim, in accordance with the present disclosure.
Figure 38:
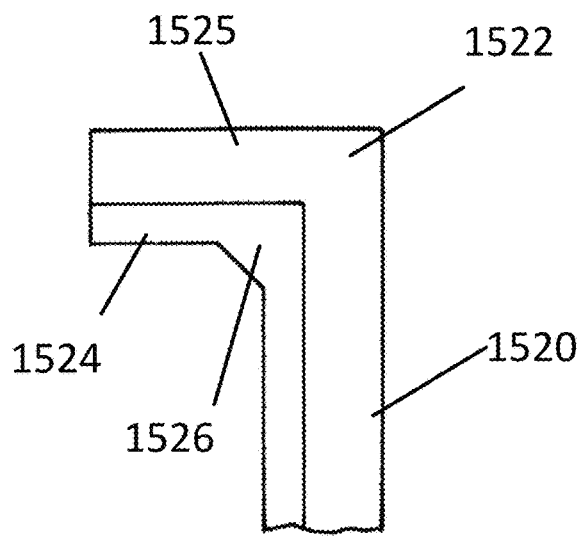
Figure 39:
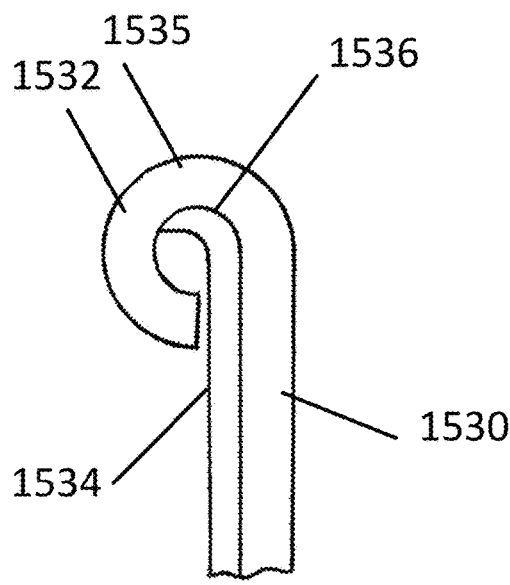
Figure 40:
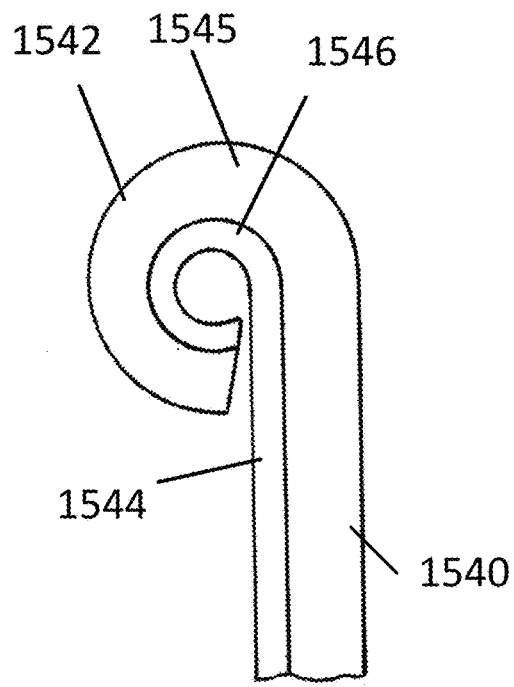

FIGS. 37-42 illustrate exemplary profiles of pizza pan rims, each with a guideline extending up a side of the pan to the rim. FIGS. 37-40 include bent rim portions extending radially outward from a center of the pizza pan. FIG. 37 illustrates a rim including a rounded straight rim. Pan wall 1510 is illustrated, including bend 1512 forming rim 1515. Guideline 1514 is illustrated including bend 1516 matching bend 1512. FIG. 38 illustrates a rim including a squared straight rim. Pan wall 1520 is illustrated, including angled bend 1522 forming rim 1525. Guideline 1524 is illustrated including angled bend 1526 matching bend 1522. FIG. 39 illustrates a rim including a rounded rim with a guideline extending through a portion of the rounded rim. Pan wall 1530 is illustrated, including bend 1532 forming rim 1535. Guideline 1534 is illustrated including bend 1536 matching a portion of bend 1532. FIG. 40 illustrates a rim including a rounded rim with a guideline extending through an entirety of the rounded rim. Pan wall 1540 is illustrated, including bend 1542 forming rim 1545. Guideline 1544 is illustrated including bend 1546 matching a portion of bend 1542.

Figure 41:
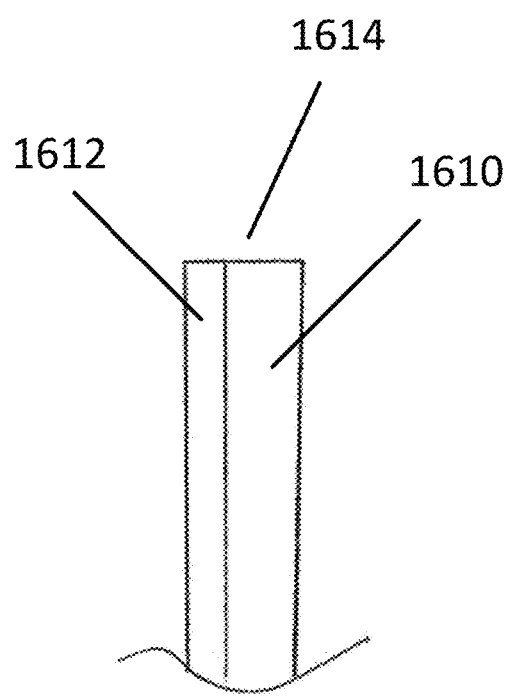
Figure 42:
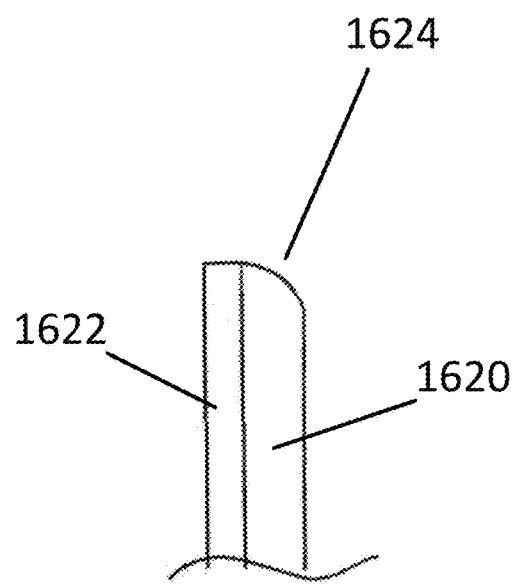

FIG. 41 illustrates a rim including an unrounded square rim. Pan wall 1610 is illustrated including guideline 1612. Pan wall 1610 terminates with a square-shaped end forming unrounded square rim 1614. FIG. 42 illustrates a rim including a rounded rim. Pan wall 1620 is illustrated including guideline 1622. Pan wall 1620 terminates with a rounded end forming rounded rim 1624. In one embodiment, rim 1624 can be formed by grinding or sanding down a square-shaped end such as is in FIG. 41.

Figure 43:
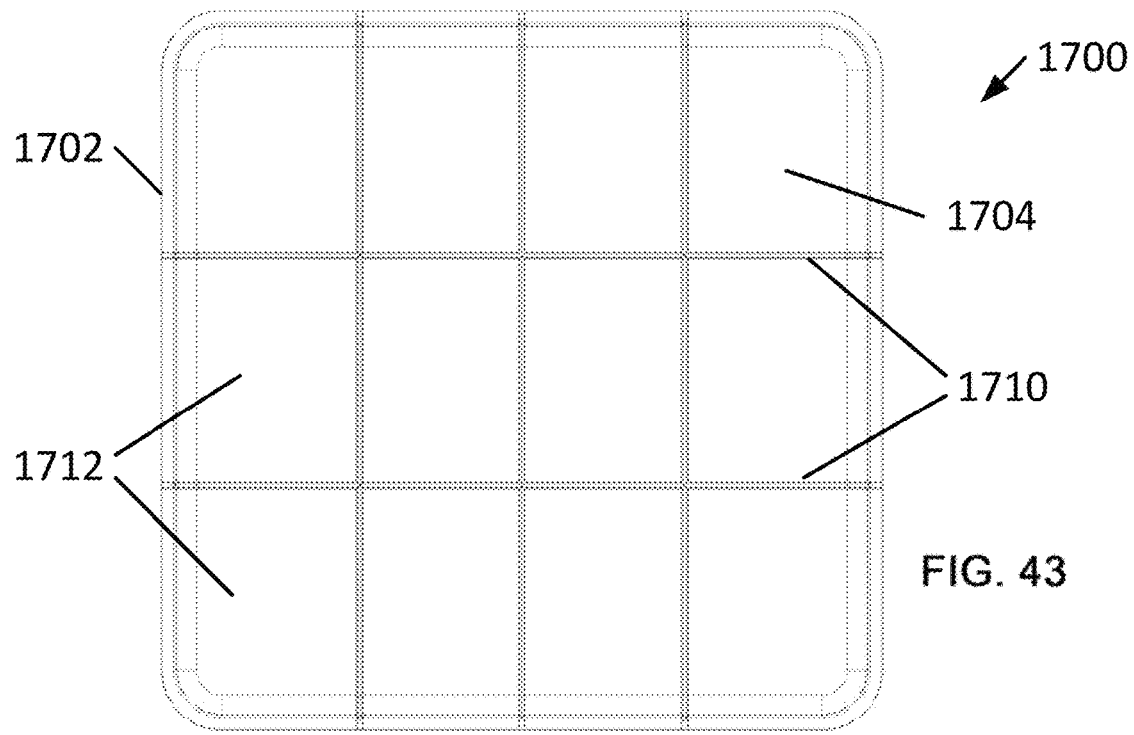
FIG. 43 illustrates an additional exemplary rectangular pizza pan, with guidelines extending contiguously from a flat base portion, up sides of the pan, and onto a rim of the pan, in accordance with the present disclosure.

FIG. 43 illustrates an additional exemplary rectangular pizza pan, with guidelines extending contiguously from a flat base portion, up sides of the pan, and onto a rim of the pan. Pizza pan 1700 is illustrated, including flat base 1704 surrounded by raised walls 1702. Curved transitions are illustrated connecting flat base 1704 to raised walls 1702. A rim is illustrated around a top of raised walls 1702. A plurality of cutting guidelines 1710 are illustrated dividing pizza pan 1700 into a plurality of rectangle-shaped sections 1712. Guidelines 1710 are illustrated extending contiguously from flat base 1704, across the curved transition, up raised walls 1702, and onto the pan rim.

Figure 44:
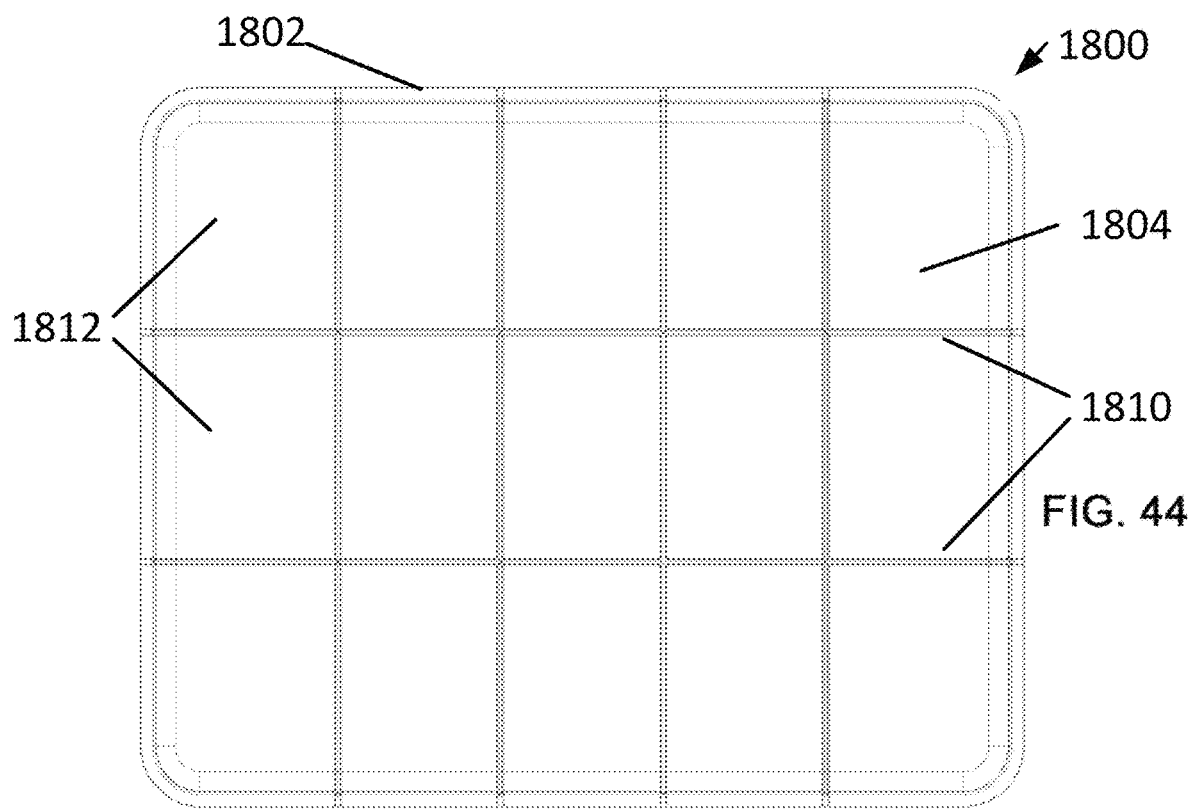
FIG. 44 illustrates an additional exemplary rectangular pizza pan, with guidelines extending contiguously from a flat base portion, up sides of the pan, and onto a rim of the pan, in accordance with the present disclosure.

FIG. 44 illustrates an additional exemplary rectangular pizza pan, with guidelines extending contiguously from a flat base portion, up sides of the pan. Pizza pan 1800 is illustrated, including flat base 1804 surrounded by raised walls 1802. Curved transitions are illustrated connecting flat base 1804 to raised walls 1802. A rim is illustrated around a top of raised walls 1802. A plurality of cutting guidelines 1810 are illustrated dividing pizza pan 1800 into a plurality of rectangle-shaped sections 1812. Guidelines 1810 are illustrated extending contiguously from flat base 1804, across the curved transition, up raised walls 1802, and onto the pan rim.

Figure 45:
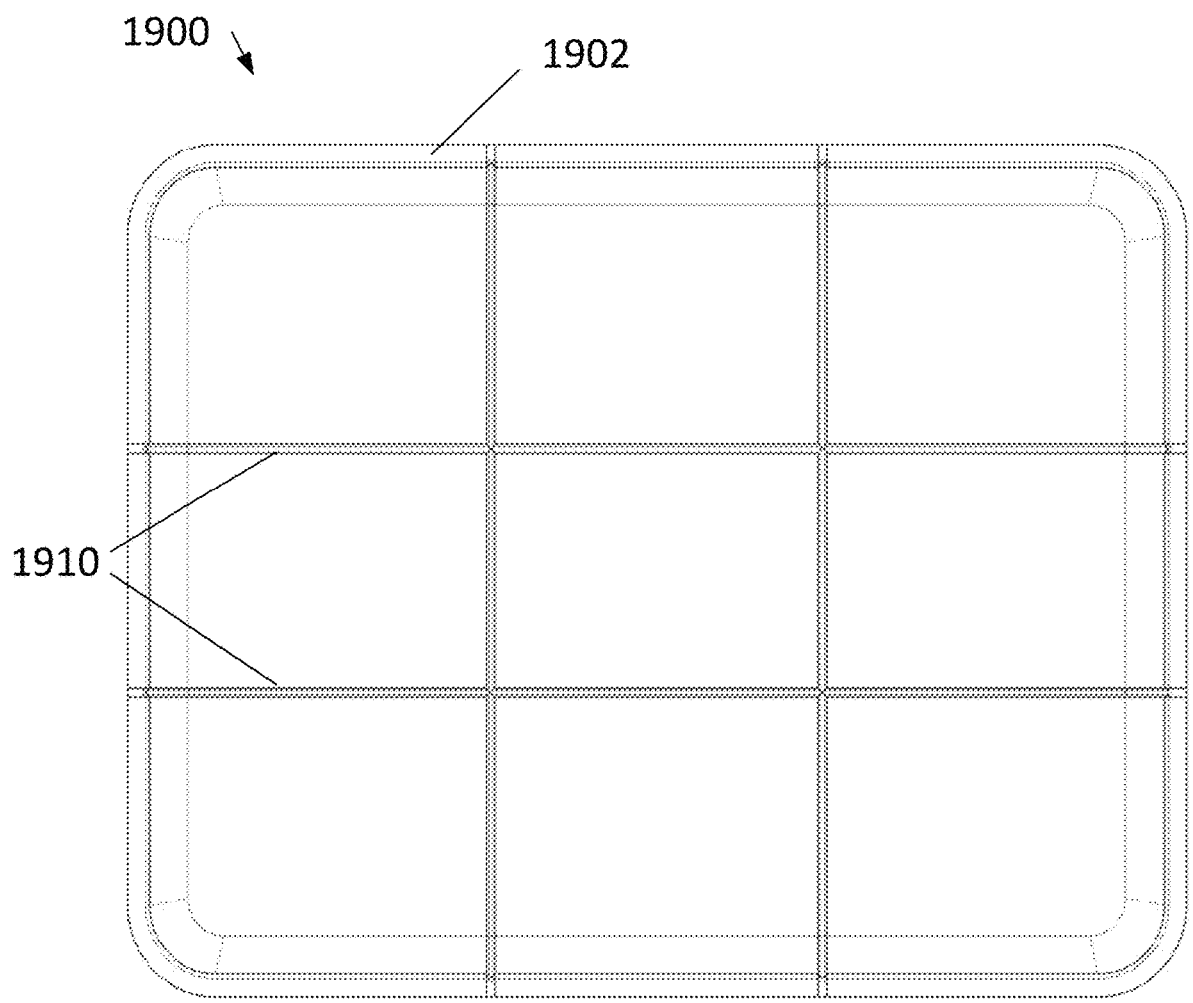
FIG. 45 illustrates an additional exemplary embodiment of a rectangular pan including guidelines, in accordance with the present disclosure.
Figure 46:
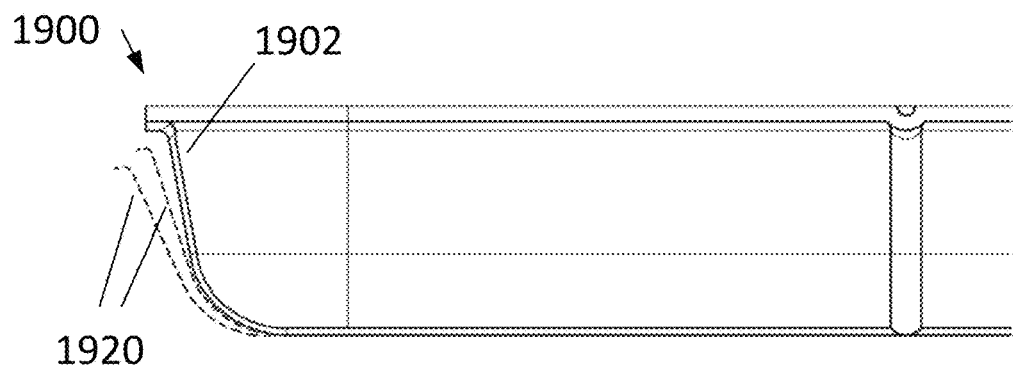
FIG. 46 illustrates the pan of FIG. 45 in side profile view, including alternative profiles for raised walls of the pan, in accordance with the present disclosure.

FIG. 45 illustrates an additional exemplary embodiment of a rectangular pan including guidelines. Pan 1900 includes a flat base surrounded by raised walls 1902. A plurality of guidelines 1910 are illustrates extending from the flat base, up raised walls 1902, and onto a rim at a top of raised walls 1902. FIG. 46 illustrates the pan of FIG. 45 in side profile view, including alternative profiles for raised walls of the pan. Pan 1900 includes a flat base surrounded by raised walls 1902. Walls 1902 can include a number of different shapes, sizes and profiles. Dotted lines 1920 are illustrated, showing exemplary alternative shapes and sizes of walls that can be used with pan 1900.

Figure 47:
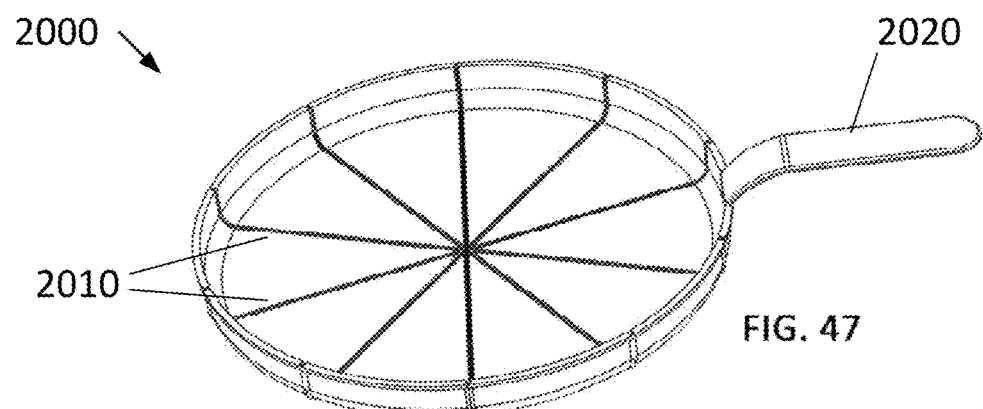
FIG. 47 illustrates an exemplary round pan including guidelines and an optional handle, in accordance with the present disclosure.

FIG. 47 illustrates an exemplary round pan including guidelines and an optional handle. Pan 2000 is illustrated including a plurality of guidelines 2010. An optional handle 2020 is illustrated connected to one raised wall of pan 2000.

Figure 48:
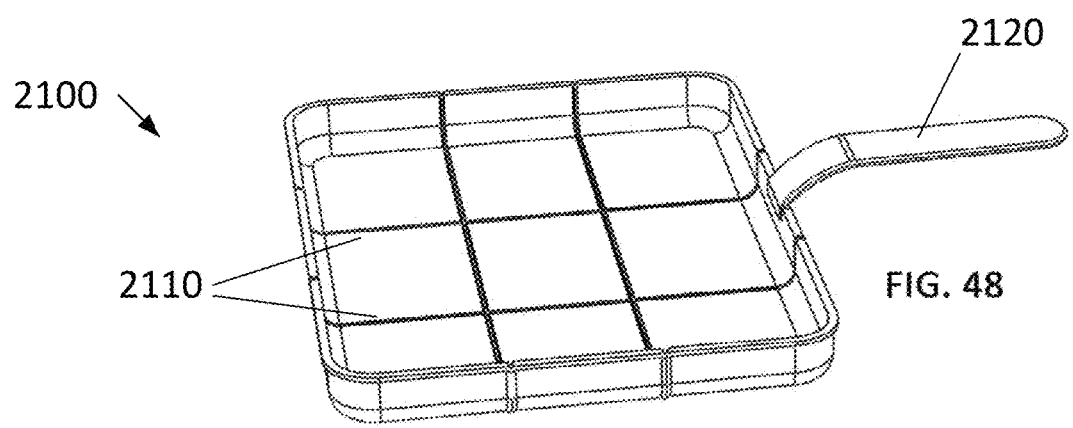
FIG. 48 illustrates an exemplary square pan including guidelines and an optional handle, in accordance with the present disclosure.

FIG. 48 illustrates an exemplary square pan including guidelines and an optional handle. Pan 2100 is illustrated including a plurality of guidelines 2110. An optional handle 2120 is illustrated connected to one raised wall of pan 2100.

Figure 49:
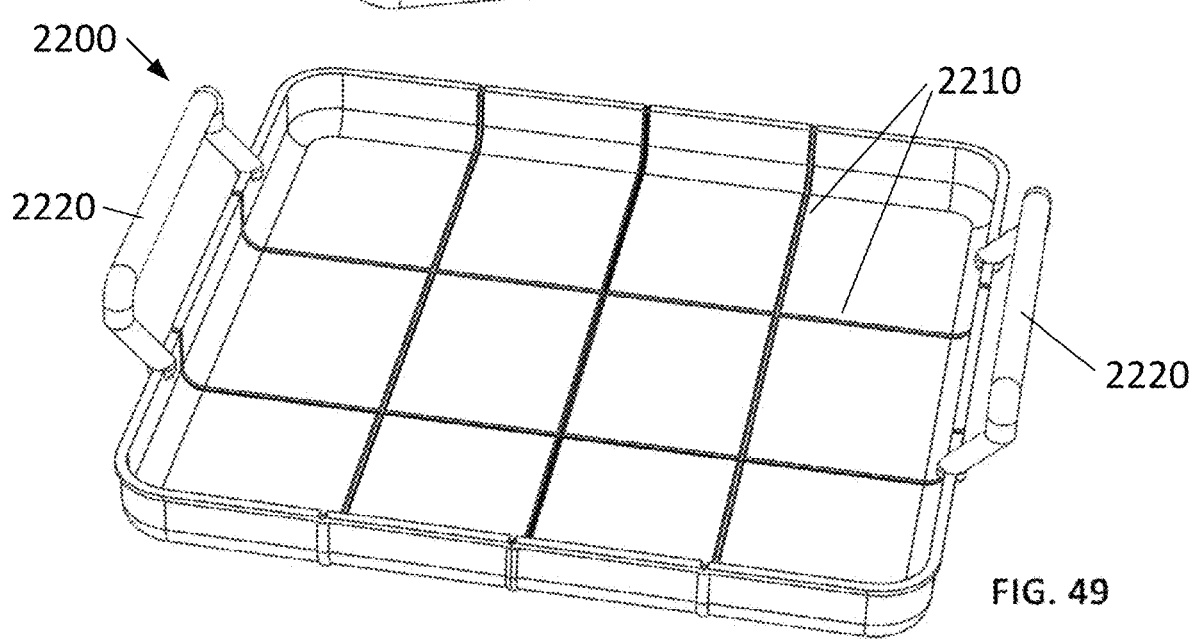
FIG. 49 illustrates an exemplary rectangular pan including guidelines and an optional handles, in accordance with the present disclosure.

FIG. 49 illustrates an exemplary rectangular pan including guidelines and an optional handles. Pan 2200 is illustrated including a plurality of guidelines 2210. An optional handles 2220 is illustrated connected to one raised wall of pan 2200.

The cooking utensils of the disclosure are described generically as pizza pans throughout the present disclosure. It will be appreciated that with minimal or no adjustment, a same pan that is used to cook pizza could also be used to cook cake, brownies, baked fruit bars, or other similar products.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising a cooking utensil including guidelines configured to aid in precisely cutting a food product into slices with desired shapes, the device comprising:
   a flat horizontal base;
   raised vertical walls surrounding the flat horizontal base, the raised vertical walls comprising a rounded rim around a top of the raised vertical walls, wherein the rounded rim is rounded away from a center of the flat horizontal base; and
   a plurality of the guidelines formed upon the cooking utensil, each guideline comprising a depressed groove, wherein each depressed groove extends contiguously from a first position on the rounded rim, down a first of the raised vertical walls, in a straight line along the flat horizontal base, up a second of the raised vertical walls, and onto a second position on the rounded rim; and
wherein the depressed groove includes material spanning from a first side of the depressed groove to a second side of the depressed groove; and
wherein each of the plurality of guidelines includes corresponding material protruding from a bottom side of the flat horizontal base.

2. The device of claim 1, wherein the flat horizontal base includes a rectangular shape.

3. The device of claim 1, wherein the flat horizontal base includes a square shape.

4. The device of claim 1, wherein the flat horizontal base includes a round shape.

5. The device of claim 1, wherein the flat horizontal base includes a polygonal shape.

6. The device of claim 1, wherein the depressed groove of each of the plurality of the guidelines further includes a U-shaped profile.

7. The device of claim 1, wherein the depressed groove of each of the plurality of the guidelines further includes a V-shaped profile.

8. The device of claim 1, wherein the plurality of the guidelines upon the rounded rim are operable as guideline locators enabling a user to put a rolling cutter into each of the guidelines upon the flat horizontal base despite the food product blocking a view of the user of the flat horizontal base.

9. A device comprising a pizza pan including guidelines configured to aid in precisely cutting a pizza into slices with desired shapes, the device comprising:
   a flat horizontal base including a round shape;
   raised vertical walls surrounding the flat horizontal base, the raised vertical walls comprising a rounded rim around a top of the raised vertical walls; and
   a plurality of the guidelines formed upon the pizza pan, each guideline comprising a depressed groove, wherein each depressed groove extends contiguously from a first position on the rounded rim, down a first of the raised vertical walls, in a straight line along the flat horizontal base, up a second of the raised vertical walls, and onto a second position on the rounded rim; and
wherein the depressed groove includes material spanning from a first side of the depressed groove to a second side of the depressed groove; and
wherein each of the plurality of guidelines includes corresponding material protruding from a bottom side of the flat horizontal base.

10. The device of claim 9, wherein the depressed groove of each of the plurality of the guidelines further includes a U-shaped profile.

11. The device of claim 9, wherein the depressed groove of each of the plurality of the guidelines further includes a V-shaped profile.

12. The device of claim 9, wherein the plurality of the guidelines upon the rounded rim are operable as guideline locators enabling a user to put a rolling pizza cutter into each of the guidelines upon the flat horizontal base despite the pizza blocking a view of the user of the flat horizontal base.

13. A device comprising a pizza pan including guidelines configured to aid in precisely cutting a pizza into slices with desired shapes, the device comprising:
   a flat horizontal base including a rectangular shape;
   raised vertical walls surrounding the flat horizontal base, the raised vertical walls comprising a rounded rim around a top of the raised vertical walls; and
   a plurality of the guidelines formed upon the pizza pan, each guideline comprising a depressed groove, wherein each depressed groove extends contiguously from a first position on the rounded rim, down a first of the raised vertical walls, in a straight line along the flat horizontal base, up a second of the raised vertical walls, and onto a second position on the rounded rim; and
wherein the depressed groove includes material spanning from a first side of the depressed groove to a second side of the depressed groove; and
wherein each of the plurality of guidelines includes corresponding material protruding from a bottom side of the flat horizontal base.

14. The device of claim 13, wherein the depressed groove of each of the plurality of the guidelines further includes a U-shaped profile.

15. The device of claim 13, wherein the depressed groove of each of the plurality of the guidelines further includes a V-shaped profile.

16. The device of claim 13, wherein the plurality of the guidelines upon the rounded rim are operable as guideline locators enabling a user to put a rolling pizza cutter into each of the guidelines upon the flat horizontal base despite the pizza blocking a view of the user of the flat horizontal base.

* * * * *